(12) United States Patent
Hammelbacher

(10) Patent No.: US 10,380,542 B2
(45) Date of Patent: Aug. 13, 2019

(54) METHOD AND DEVICE FOR PROCESS TRACKING OF OPERATIONS OR SERVICES RELATING TO AT LEAST ONE OBJECT

(71) Applicant: Stephan Hammelbacher, Reichersbeuern (DE)

(72) Inventor: Stephan Hammelbacher, Reichersbeuern (DE)

(*) Notice: Subject to any disclaimer, the term of this patent is extended or adjusted under 35 U.S.C. 154(b) by 0 days.

(21) Appl. No.: 14/432,467

(22) PCT Filed: Sep. 30, 2013

(86) PCT No.: PCT/EP2013/070329
§ 371 (c)(1),
(2) Date: Mar. 30, 2015

(87) PCT Pub. No.: WO2014/053436
PCT Pub. Date: Apr. 10, 2014

(65) Prior Publication Data
US 2015/0254602 A1    Sep. 10, 2015

(30) Foreign Application Priority Data

| Oct. 1, 2012 | (DE) | ........................ | 10 2012 109 320 |
| Oct. 17, 2012 | (DE) | ........................ | 10 2012 109 907 |
| Oct. 26, 2012 | (DE) | ........................ | 10 2012 110 291 |

(51) Int. Cl.
G06Q 10/08    (2012.01)
A01K 1/03    (2006.01)
A01G 7/00    (2006.01)

(52) U.S. Cl.
CPC ........... *G06Q 10/087* (2013.01); *A01K 1/031* (2013.01); *A01G 7/00* (2013.01)

(58) Field of Classification Search
CPC ......... A01K 1/031; G06Q 10/087; A01G 7/00
See application file for complete search history.

(56) References Cited

U.S. PATENT DOCUMENTS

| 4,947,322 A * | 8/1990 | Tenma ............. G06Q 10/06312 705/7.22 |
| 5,383,111 A * | 1/1995 | Homma ............... G06Q 10/087 235/385 |

(Continued)

FOREIGN PATENT DOCUMENTS

| DE | 69808505 T2 | 7/2003 |
| DE | 10341125 A1 | 4/2005 |

(Continued)

OTHER PUBLICATIONS

International Search Report; PCT/EP2013/070329; dated Dec. 12, 2013.

*Primary Examiner* — Ramsey Refai
(74) *Attorney, Agent, or Firm* — Studebaker & Brackett PC

(57) ABSTRACT

The invention relates to a device, in particular for an animal space facility or a plant laboratory facility (for example according to WO 2011/124 209 with a changing station) or a warehouse which is suitable for performing a method for the organization of at least one object, with a rack or a cage arrangement with an operating side, with containers or cages which contain at least one object, with a device for recording the containers in the rack and with a computer unit for storing and processing of data, wherein the recording device is equipped and configured to record the location of one or more containers in the rack. Furthermore, the invention comprises a method for the process tracking of operations and/or services relating to at least one object, in particular in an animal space facility or a plant laboratory facility with a rack with containers arranged therein, which contain the object (or objects) and with a database holding data relating to the containers or their contents.

19 Claims, 12 Drawing Sheets

(56) References Cited

U.S. PATENT DOCUMENTS

Figure 1:
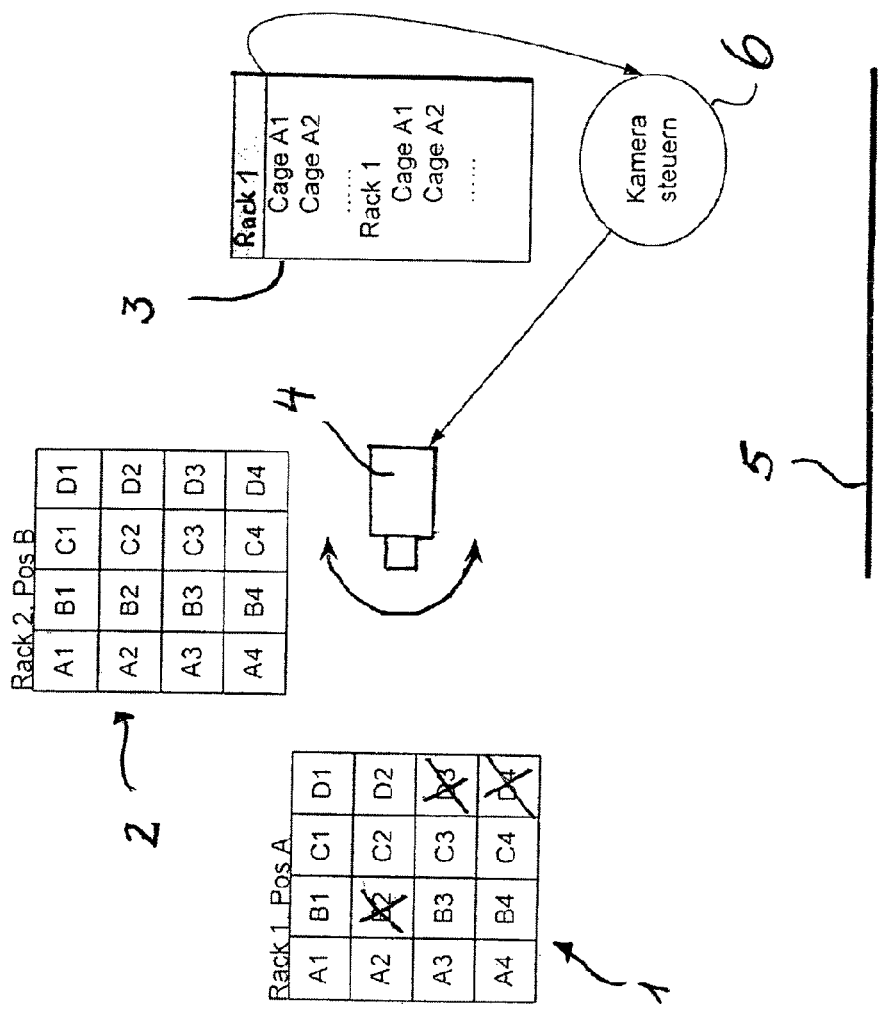

| | | | | |
|---|---|---|---|---|
| 5,963,920 | A * | 10/1999 | Rose | G06Q 20/203 705/22 |
| 6,357,395 | B1 | 3/2002 | Nilsson | |
| 6,678,413 | B1 * | 1/2004 | Liang | A61B 5/1113 348/169 |
| 6,998,980 | B2 * | 2/2006 | Ingley, III | G08B 25/10 119/421 |
| 7,126,471 | B2 * | 10/2006 | Ahmed | G01S 13/825 119/455 |
| 7,699,226 | B2 * | 4/2010 | Smith | G06Q 10/087 235/451 |
| 7,949,568 | B2 * | 5/2011 | Fano | G06K 9/00 356/4.03 |
| 8,009,864 | B2 * | 8/2011 | Linaker | G06K 9/00664 235/385 |
| 8,189,855 | B2 * | 5/2012 | Opalach | G06Q 10/087 382/100 |
| 8,325,036 | B1 * | 12/2012 | Fuhr | G06Q 10/087 340/5.92 |
| 8,533,601 | B2 * | 9/2013 | LaForest | H04L 41/22 715/735 |
| 9,516,858 | B2 * | 12/2016 | Conger | A01K 1/0047 |
| 9,595,098 | B2 * | 3/2017 | Hicks | G06Q 10/0875 |
| 9,996,818 | B1 * | 6/2018 | Ren | G06F 16/5866 |
| 10,078,826 | B2 * | 9/2018 | Morandi | G06K 9/00 |
| 10,097,756 | B2 * | 10/2018 | Levien | H04N 5/765 |
| 2003/0154141 | A1 * | 8/2003 | Capazario | G06Q 10/087 705/26.1 |
| 2004/0217858 | A1 | 11/2004 | Ingley, III et al. | |
| 2006/0071773 | A1 * | 4/2006 | Ahmed | A01K 1/031 340/521 |
| 2006/0185611 | A1 * | 8/2006 | Copeland | A01K 1/031 119/419 |
| 2007/0040682 | A1 * | 2/2007 | Zhu | G06Q 10/087 340/572.1 |
| 2007/0100713 | A1 * | 5/2007 | Del Favero | G06Q 10/087 705/29 |
| 2008/0144934 | A1 * | 6/2008 | Raynaud | G06K 9/00 382/173 |
| 2008/0215462 | A1 * | 9/2008 | Sorensen | G06Q 9/00771 705/28 |
| 2009/0002496 | A1 * | 1/2009 | Esmaeili | A01K 1/031 348/207.1 |
| 2009/0121017 | A1 * | 5/2009 | Cato | G06Q 10/087 235/385 |
| 2009/0204512 | A1 * | 8/2009 | Connell, II | G06Q 10/087 705/28 |
| 2009/0293815 | A1 * | 12/2009 | Coiro, Sr. | A01K 1/031 119/417 |
| 2010/0121480 | A1 | 5/2010 | Stelzer et al. | |
| 2010/0249987 | A1 * | 9/2010 | Hong | A47B 53/02 700/215 |
| 2012/0085291 | A1 * | 4/2012 | Conger | A01K 1/0047 119/419 |
| 2014/0055248 | A1 | 2/2014 | Hammelbacher | |
| 2016/0275351 | A1 * | 9/2016 | Cattoen | G06K 9/00664 |

FOREIGN PATENT DOCUMENTS

| | | |
|---|---|---|
| EP | 1334657 A2 | 8/2003 |
| WO | 1999/025180 A1 | 5/1999 |
| WO | 2001/024618 A1 | 4/2001 |
| WO | 2006/069347 A1 | 6/2006 |
| WO | 2011/124209 A2 | 10/2011 |

* cited by examiner

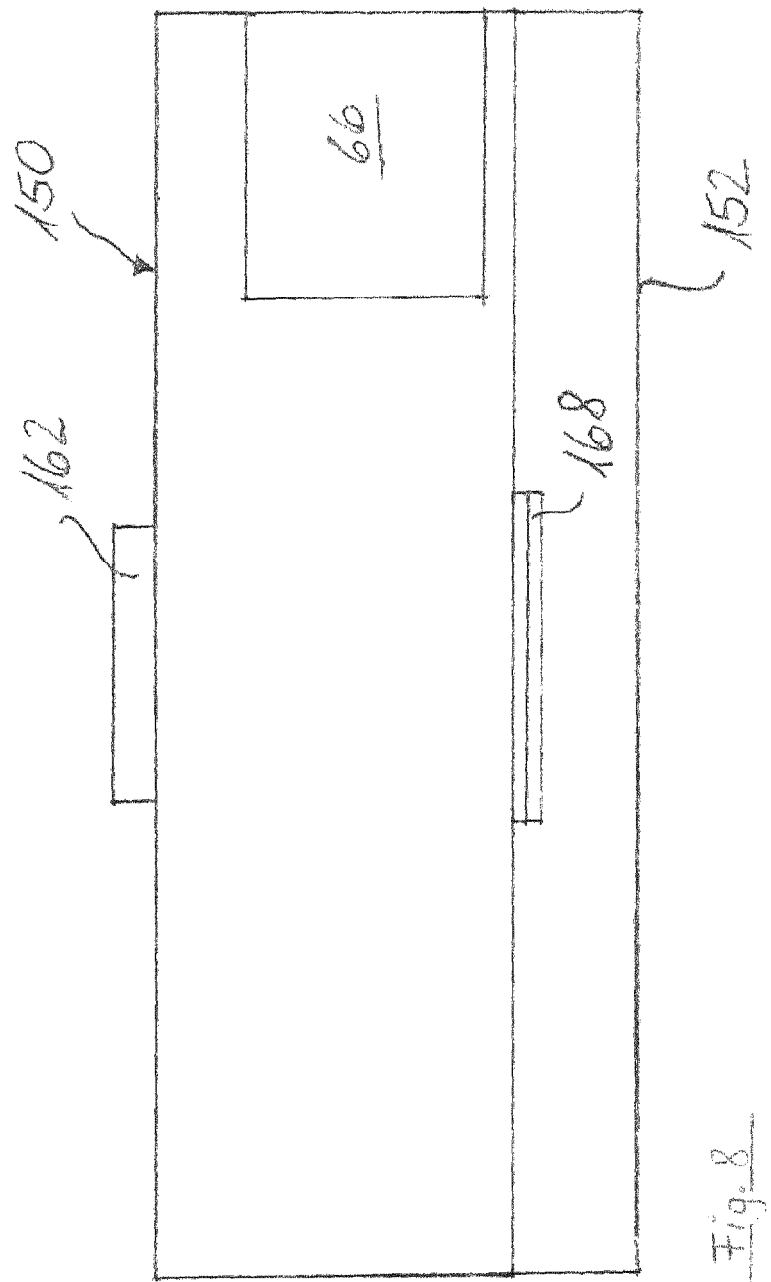

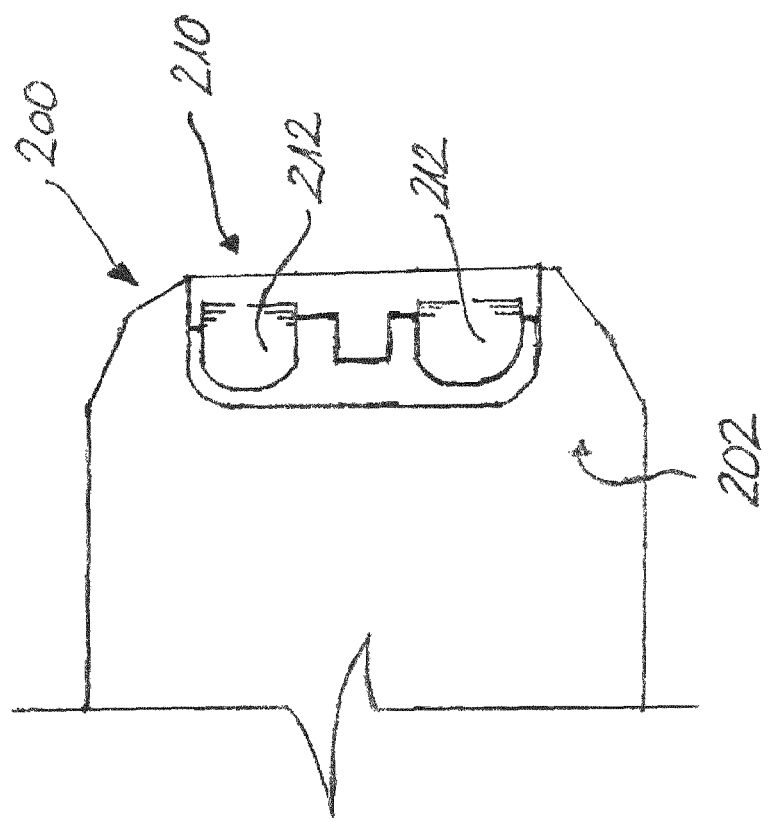

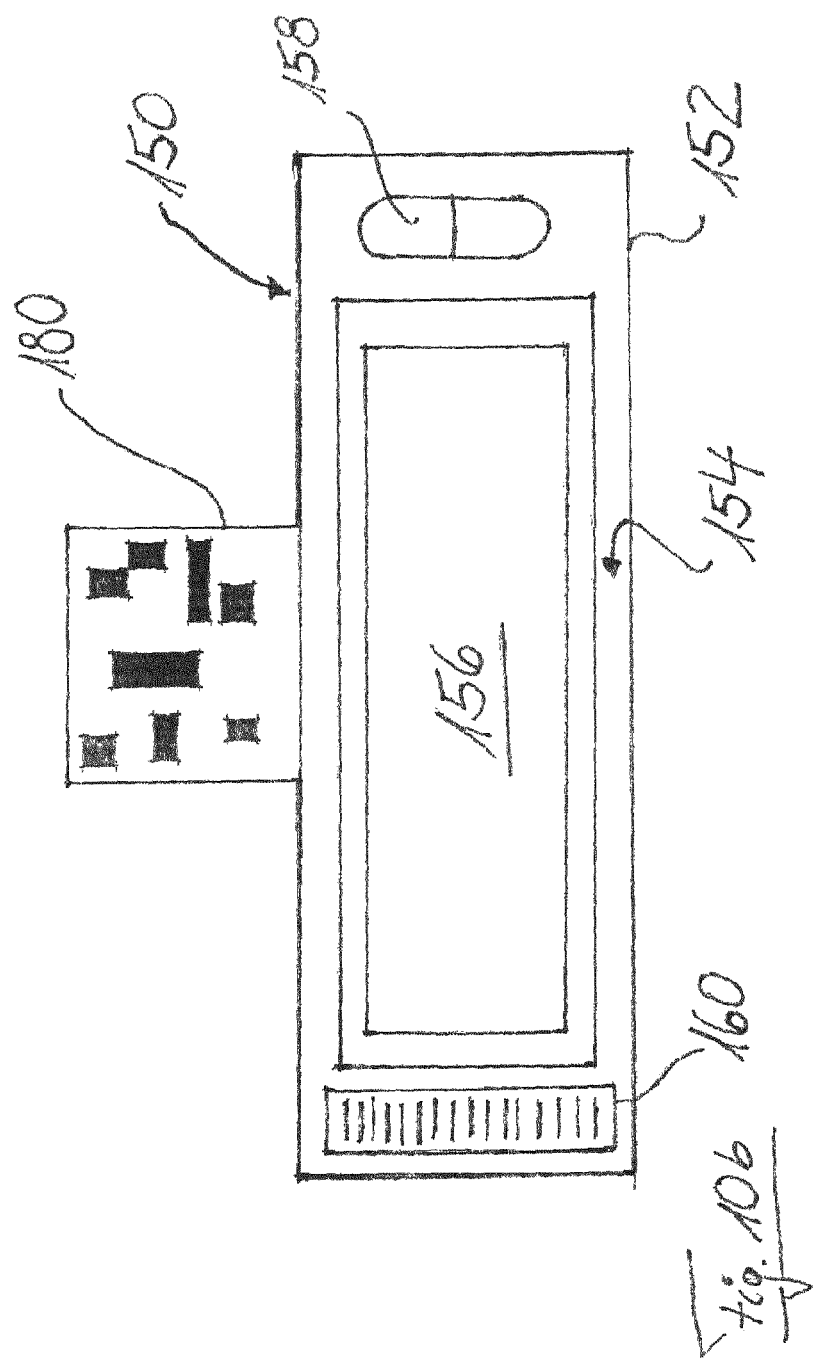

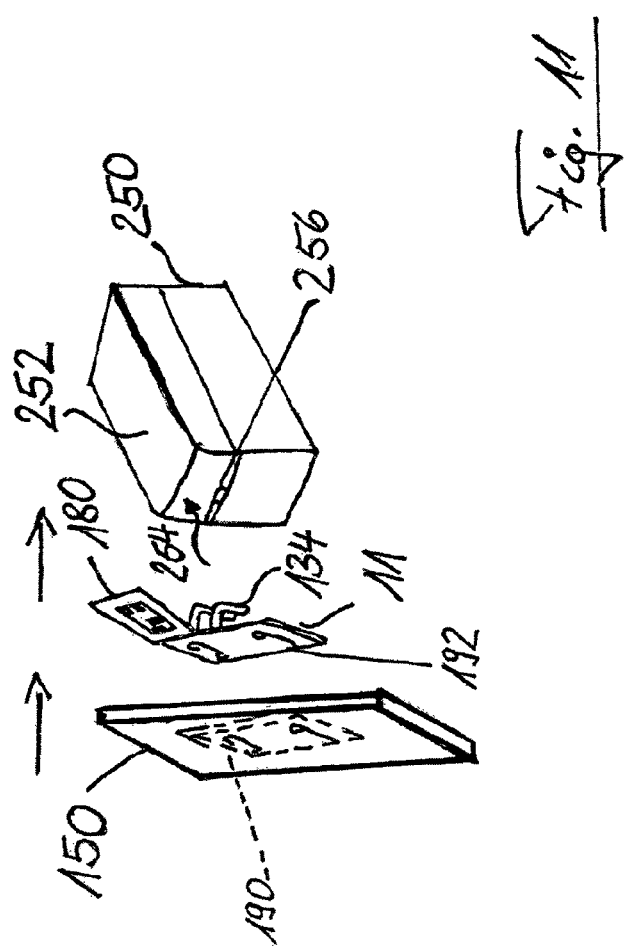

METHOD AND DEVICE FOR PROCESS TRACKING OF OPERATIONS OR SERVICES RELATING TO AT LEAST ONE OBJECT

The invention relates to a device, in particular for an animal space facility or a plant laboratory facility, which is suitable for performing a method for the organisation of at least one object, with a rack or a cage arrangement with an operating side, with containers or cages which may be empty or may contain at least one object, with a device for recording the containers in the rack and with a computer unit for storing and processing of data. The organisation of one or more objects may concern process tracking of operations and/or services relating to at least one object and/or relating to determining the presence of an object, wherein the container itself may be the object. The organisation of the object may therefore happen indirectly via the organisation of its container, in particular if the object is not suitable for direct organisation. The operating side is normally a front side of the rack, from which the removal of containers or the loading thereof takes place. When the containers are recorded their presence in or absence from the rack is recorded or their presence in a certain position is recorded.

The WO 2011/124 209 describes a method for process-tracking operations and/or services, which relate to at least one object, where a reading device records data or attributes of a data carrier associated with the object or its containers, wherein the data describes the object using the steps of identifying the object by recording the data of the data carrier by means of the reading device, and of recording an operation or a service and/or the data obtained thereby of the object, wherein between the two steps in dependence of the recorded data, a selection from a plurality of operations and/or services is offered with the selection being offered to an operator for execution. In addition a computer program product is described for programming a computer system and a changing station for performing the method.

It is the requirement of the invention to develop a method for performing process tracking of operations or services in an animal space facility, a plant laboratory facility or the like in such a way that this becomes more reliable and less susceptible to errors.

With the device mentioned in the beginning this requirement is solved in that the recording means is adapted and configured to specifically record the location of one or more containers in the rack. For simplicity's sake the invention will now be described below, mainly by way of a container in a rack of an animal space facility, wherein it is of course applicable to several containers and several racks of other facilities and also for other purposes of use, wherein a difference may be made according to the size of the racks and the containers. This would include, for example, facilities with very small racks and containers, such as laboratories with tissue/cell/blood samples or insects and plant laboratory facilities for seeds and germ buds or facilities with larger racks and containers such as in hospitals with patients as "objects" in patient beds/compartments as "containers" and rooms as "racks" and for logistics in industry and commerce with commissioning bays with racks and high-bay warehouses, or in the food industry with racks in which ripening processes are controlled. According to the invention therefore it is not only the presence or absence in principle of a container in the rack, independently of its location in the rack, which is detected, but also its specific position in the rack or in the slot in which it is/they are or are meant to be. In this way rack positions can be recognised and signalled which do not correspond to the actual position of the container in the rack for example, because an inattentive user has indicated the wrong rack position on the container's cage card. If a mix-up of containers and their associated positions in the rack can no longer happen without this being noticed, the wrong objects can no longer be processed during subsequent processing and data can no longer be wrongly assigned without an error message being issued. This, in particular, is important in cases where the objects are so small that marking them is impossible and is restricted to their containers in which they dwell, and planning any transactions for these objects is only possible on the basis that the objects have a defined position in a rack. For according to the invention a rack is not now regarded as complete and correctly loaded when all containers are present. Rather the invention ensures that a desired state is not reached and signalled, until each container is positioned in its intended location in the rack. This means that the data in the associated data base also obtains a higher quality and reliability. For example according to the invention a mix-up of two containers assigned to the same rack is detected and signalled as required. Thus correct loading of the rack with containers is reliably checked after removal of the container, so that for example an inadvertent swap of two containers can be recognised at least at an early stage.

A suitable device according to the invention for larger objects may be based for example on the mechanical principle that each container in its rack slot has a counterpart assigned to it according to the key-lock principle. As a result a container can be correctly positioned in the rack only if it fits onto its counterpart in the rack slot. This may for example be a plug-and-socket arrangement. Admittedly such systems may be inflexible in case of positional changes of the containers because each cage is then restricted to fit only into its defined rack slot. According to an advantageous development of the invention the container may be contactlessly detectable. This would exclude mechanical elements based on making physical contact but also switch systems or button systems. For such detecting systems are as a rule relatively expensive to install. A contactlessly working recording device, on the other hand, could normally be constructed in a simple but very robust manner, would not restrict operation of the rack and would not be prone to failure. As such light barriers mounted in front of the rack could permit position detection as to which container was/is being manipulated. For a rectangular rack or a rectangular contour of the operating side of the rack, a horizontally and a vertically active light barrier would be sufficient in order to be able to determine an accurate position of the container which is being removed. Alternatively a barcode reader could be provided at each rack slot and each container which records a barcode on the container and thus the container itself, as soon as it is removed from the slot or is placed back into the slot. In addition a contactlessly operating recording device offers the advantage of being able to be stationarily arranged in a room with several racks, wherein the racks to be checked can be moved/driven into their detection zone. Alternatively a recording device destined for several stationary racks may be arranged in a mobile manner and be moved towards the rack to be checked when recording/detection is to take place. In both cases a contactlessly working recording device is able to be used for several racks so that it is not necessary for each rack to have its own recording device. Thus considerable cost savings can be achieved for the recording device.

In cases where mechanical recording devices according to the key-lock principle are too inflexible, light barrier systems may be too inaccurate if two containers are simultaneously actuated and individual barcode readers for each container may be too expensive. As a rule containers bear identification means, for example cage cards on which data of the container are deposited. Data of the container may concern the container itself, for example its position in the rack, but also data of its content, for example strain, gender and age of the test animal. The identification means may be combined, if required, with an electronic memory chip as additional data carrier for the same and possibly further data. According to a further advantageous development of the invention the identification means may be detected by radio. Therefore a transmitter such as an active or passive transponder may be attached to the container or its identification means, which for example makes use of HF, UHF, IR or UHF-RFID technology for identification. The recording device thus encompasses an appropriate receiver with which the transmitter on the container can be detected. For example, by driving along the rack with directional antennae each individual container can be detected separately and with reference to its location, thereby enabling the rack to be checked for completeness and correct positioning of its containers.

According to an alternative embodiment of the invention each container may comprise a positional marking which is deposited on the container as a data matrix code or braille code or even in plain text and which marks the associated slot in the rack so that the recording device optically detects the entire rack or e.g. sections of its operating side and thus each individual container up to its positional marking. This variant of contactless detection requires no separate transmitter but essentially detects existing identification means, for example an imprint on the container itself or on a cage card or on the cage card holder. The recording device at any rate can optically detect the entire rack and/or each individual container. The recorded picture of the container or containers can then be compared with as picture which shows a desired state. Advantageously the recording device may be connected with a suitable data processing device, which offers an analysis software with image recognition and compare function. In this way an image of a current recording, i.e. a current image of the rack or a section thereof can be electronically compared with a comparison image, which shows the desired state of the rack or the positioning of the container. Discrepancies are then signalled to a user of the device following an image analysis.

Preferably not only the presence or absence of a container are detected but also data, e.g. the position which its bears as plain text, barcode or data matrix code. Subsequently the data may be checked for a match with the associated data stored in the data base and signalled accordingly.

Suitable optical recording devices may be for example cameras running on rails or fixed in a stationary position and which can be swivelled to face the rack and/or which, following selection of the rack via a software, may be directed/swivelled towards the same. Alternatively it may be carried on the head of the user or as data spectacles, i.e. as a mini-computer carried on the head, which is mounted on a spectacle frame, brings information into the user's field of view (so-called head-up display), combines this information with the detected picture supplied live by a digital camera integrated in the user's field of view and which externally directly draws data for example from the internet or a data base and/or transmits them to the internet and which can process speech inputs by the user (e.g. Google Glass®). It may be functionally or constructionally separately associated with each rack or may be installed independently thereof in a room, in which there are one or more racks. A manual evaluation of the recorded data or an evaluation by a user may thus be omitted when using a recording device according to the invention.

According to a further advantageous development of the invention the 3-D camera may serve as an optical recording device which detects the container and its content. With a conventional rack a small distance to individual containers may be favourable for evaluating recordings. The container content/the object contained therein such as test animals can be reliably recorded and evaluated by a suitable analysis software. Using a 3-D camera a point array of an object in the container can be created. Point arrays have characteristic contours so that for known objects such as mice a skeleton can be "programmed into" these point arrays. This allows recognition, not only of how many animals are in the cage but also in which positions they are and how they move in relation to one another. A method of this kind is already known using e.g. a KINECT® camera from MICROSOFT Inc. or a XTION® camera from ASUS Inc. for human skeletons. The invention thus permits observing the object and evaluating it digitally without any interference by a human being. This not only leads to new analysis options, but also to fewer potential operating errors by a user. In particular image evaluation for the user is greatly improved.

Software-supported recording devices as a rule comprise a conversion unit which converts the recorded data into electronically processed data thus allowing them to be further processed in the computer unit. The recording device therefore advantageously encompasses a data interface for forwarding the data to the computer unit. A comparison unit or analysis unit is housed in the computer unit or apart therefrom, in which the data can be compared/analysed with stored data, for example a database with the data of the respective rack and its containers. In case of discrepancies and/or when a match is found with the comparing data record, a signal device may emit a warning or confirmation signal. The warning signal may be at least an electrical or an electronic pulse, but advantageously is an optically or acoustically detectable signal.

Finally the device may comprise a switch-on device for its activation which consists of either a switch constructed largely in any conventional manner which is operated by being actuated by the user or by a user entry. Or, alternatively or additionally, the switch-on device may be triggered largely automatically, for example by recording an operation of the rack or a manipulation of a container, i.e. it may be configured as a recording device. It may, for example, be based on recording a light-barrier signal, on recording a movement of a user in front of the rack by a motion detector or by a change in location of a container recorded by radio or on the recording of a spoken command, in particular in conjunction with data spectacles (e.g. Google Glass®). A separate actuation or activation of the recording device can thus be omitted, so that the content of the rack can be continuously monitored and thus preventing the data of the associated data base from being inadvertently manipulated. This ensures that data is recorded with a high degree of reliability and that the data in the database or of a high quality. In case a camera shall support the removal of containers of several racks in one room, the rack to be manipulated can be selected in the software. The camera can then automatically direct itself towards the rack based on the stored rack position in the room.

From the WO 2011/124 209 A2 it is known to provide the containers with an electronic label as an identification means. Electronic labels are, for example, known from the food industry, in particular from wholesale markets, as "electronic shelf labels" and are called Smartlabels in the following. They can have data relating to the container and its content stored in them, which are at least partially displayed. According to a further advantageous development of the invention the device encompasses a transmitting and receiving device which is coupled with the computer unit and which is configured for communication with the Smartlabel. Thus the identification means of the container can be further developed into a display means readable by humans or by machine.

According to a further advantageous development of the invention the transmitting and receiving device is provided outside a changing station but inside an animal space facility or plant laboratory facility or warehouse. It does therefore not have to be configured for local communication with the Smartlabel but can communicate with it also over longer distances. The invention thus permits a quick recording and checking of the content of individual containers up to the complete rack content in that both the presence of an individual container or of several individual containers can be checked or the entire rack can be recorded in the manner of a stock taking operation. The communication between the transmitting and receiving device and the Smartlabel may be based optically on recording an optical code such as a barcode, QR or data matrix codes or wirelessly on HF, UHF, IR or WLAN technology or a combination of these technologies.

According to a further advantageous development of the invention a transmitting and receiving device may be provided in a container-processing facility, for example in a changing station or a laboratory facility or in a commissioning cart or fork lift truck of a warehouse and record the Smartlabel there or manipulate the data of the Smartlabel in dependence of completed operations or services. The data record of the Smartlabel can thus be updated during a working process e.g. in the changing station without an additional user entry or the printing and exchanging of cage cards or labels being necessary. The invention thus not only permits to quickly assign data to a container, which were changed by completed processes or rendered services in the changing station, but also reliably eliminates a source of error arisen through a mix-up of cage cards and containers. As a result highly reliable data recording and a high quality of the data base can be guaranteed. Because it is possible to "ping" the Smartlabel over a distance, i.e. check it for its presence and activity (so-called "wakeup"), the presence of the container can be electronically checked. The invention is therefore also suitable for creating an inventory and can, as a quotient consisting of the recorded holdings registered at the changing station and the count ("pinging") of the actually existing containers, supply the so-called inventory difference as a measured value for measuring the quality of the organisation and the data base with regard to the associated rack/the entire facility.

A Smartlabel as a rule comprises a display area for the retrieval of data. Depending on the size of the display area it may however, not always be possible to display all of the data of the container and of the object contained therein, which are stored in the memory of the Smartlabel. However, using a so-called access key, it is possible to "scroll" through the data on the display. According to a further advantageous development of the invention a separate mobile reader may be provided for displaying at least a selection of the data of the Smartlabel. The mobile reader may be a visual display unit or data spectacles, in particular with a communication means, e.g. Google Glass®, which makes all data of the Smartlabel or e.g. only those not displayed visible. This may happen by optically scanning the code by means of data spectacles (e.g. Google Glass®), and by communication with the data base and display of the data in the spectacles or inductively or actively by reading LF, e.g. with 125 or 128 KHZ, with HF, e.g. with 13.56 MHZ or with UHF, namely with 800 to 1200 MHZ transponders and by communication with the data base and display of the data in the spectacles, or exclusively by communication with the Smartlabel and visibly displaying the data stored therein. Thus a user standing in front of the rack can display the data of a container or its content, even if in the case of RFID nothing or only a part such as the code can be optically recognised on the Smartlabel. Thus, by using exclusively codes on the Smartlabels, be it in the form of optical or electro-magnetically transmitted codes, it is possible to use smaller or more cost-effective Smartlabels.

According to a further advantageous development of the invention each rack slot may comprise an individual ID and each container may comprise a positioning mark corresponding to the ID of its associated slot. In a simple case the rack, at each slot, may carry a label with the slot number, for example B4. The container associated with the slot also carries "B4" as a positional mark on its identification means. Thus a user standing directly in front of the rack and comparing the ID of the slot, i.e. the slot number with the positional mark of the container, can check its position without having to access the data base of the computer unit. The comparison may be made easier if the slot numbers on the one hand and the positional marks of the container on the other are arranged spatially close to each other.

According to a further advantageous development of the invention each container in the rack may comprise an individual code externally to a cage card or externally to a display of a Smartlabel, which code can be read by machine from the container deposited in the rack in a conventional manner or if required additionally or exclusively by the recording device. In a simple case the code may be the positional marking of the container. A machine-readable code may be an optical or a radio code. A code is understood to be any random character combination or row of other information carriers which can be decrypted and thereby translated into e.g. usable number or letter information. Once equipped with the code the container can be individualised and recorded separately from its content and without cage card or other changeable identification means, also with regard to its location. The container is therefore no longer exclusively individualised by its place in the rack, i.e. it is no longer fixedly assigned to its place. All the same correct positioning of the container in the rack is helpful for the orientation of the user. However, the information regarding the correct container location within the rack need not be marked on the cage card or the Smartlabel, which if there is a mix-up, could lead to an erroneous association or if it gets lost, to a loss of the assignment to the respective data record in the data base. This constitutes a relief for the identification means, in particular the display of the container, resulting in a reduction in size for the display area. As a result there may be material savings. In particular this allows smaller Smartlabels to be used which are considerably cheaper than larger ones. According to the invention this simplifies the operation and care of the rack/its containers and the objects contained therein, because a mix-up of a container position can be mechanically recorded and can be immediately remedied. Smaller Smartlabels also make it distinctly easier to gain a clearer view the objects in the container. This is for example important when objects shall be studied in the container.

In principle the code can be attached to the container in a random manner. According to a further advantageous development of the invention the code may be permanently or reversibly attached to the container. Depending on the intended use, the container itself may carry an individual code. If the container itself or any non-separable part of the container carries the code, it is unequivocally assigned to it and can no longer be separated from the container. Alternatively or additionally any given part of or add-on part of the container which can be separated from the container can carry the code. For example a card holder or a container lid with attached card holder, which can be disconnected from the container, can be marked with the code. The assignment of the code of the container can thus be changed in principle by exchanging the card holder or the lid, which would indicate a certain flexibility in using the container. However, such an action does not usually happen by mistake or inadvertently so that the quality of the associated data base is not negatively affected because there is little danger of operating errors. Also further parts of the container or its add-on parts are feasible as an alternative or additional location/carrier of the code, for example a separate adapter for attaching the card holder to the container or the housing or a holder of a Smartlabel. Advantageously the card holder may be constructed in such a way that it can be used with different container types by means of a usable and replaceable container adapter.

Finally the code need not be attached to an already existing part or add-on part of the container. According to a further advantageous development of the invention it may be affixed to a code carrier which can be permanently or reversibly attached to the container itself, a card holder, an adapter, the housing of the Smartlabel and/or any other suitable place on the container in the manner of a sign, a label or inlay. In principle therefore it may be attached at any place on the container which is readable in a conventional manner or by machine. An optically readable surface is as a rule that surface or side of the container which, when the container is positioned in the rack on the operating side of the rack, is directly or indirectly detectable by means of the respective technology.

A machine-readable suitable code is e.g. a point pattern or a chaotic pattern (e.g. Braille code), a barcode, QR code or data matrix code, or an optically detectable code. It may be optimised as regards its readability in that it is printed or applied by laser onto a non-reflecting background, e.g. on a container itself. Alternatively or additionally it may be provided with a luminescent substance such as with nanoparticles or nano pigments as has been disclosed in the EP 1 736 914 A2. The technique of luminescent nanoparticles also supports e.g. the display of very small codes, e.g. in cell racks which in certain circumstances may be readable only if optically enlarged, i.e. with the aid of a magnifying glass or zoom.

Alternatively the code may be detectable via radio, i.e. be equipped via the above mentioned radio technologies and be detected by an appropriate reader on the rack, in a changing station or in a mobile reader. As such it may be stored in a near-field-communication chip (NFC). The NFC chip may be integrated with the Smartlabel or may be attached outside the Smartlabel but in its housing, for example. If combined with a Smartlabel it is recommended to arrange it such that it remains electronically "visible", for example on a separate adapter so its detection is not affected by the electronics of the Smartlabel.

The above mentioned requirement is, moreover, met by a Smartlabel for animal space facilities or plant laboratory facilities or the like, which comprises an adapter which encompasses a code which can be detected optically and/or by radio. The Smartlabel may be configured in the above-mentioned manner. The adapter, a holder or carrier of the Smartlabel, may be designed in a detachable or replaceable manner, enabling the Smartlabel to be attached in principle to containers of different systems. The adapter in turn may have a mechanical interface to the container, such as a hook, clip or the like, which can be separately exchanged in relation to the adapter. The same adapter can thus be attached to containers of different systems. At any rate, the adapter may represent the code carrier so that a container may be marked separately from the display of the Smartlabel with the optically and/or wirelessly detectable code, for example with an HF transponder.

It is the requirement mentioned in the beginning to develop known processes for performing process tracking of operations or services in a hospital, an animal space facility, a plant laboratory facility, a warehouse or the like, in a more reliable and less error-prone manner. Such facilities as a rule comprise racks and containers arranged in them, which may be empty or may contain one or more objects, and a database which contains data on the containers/their content, i.e. data on the objects. According to the invention the above mentioned requirement is solved by a method with the following steps:

a) activating a recording means for recording containers in the rack, b) recording a change on the container arrangement, c) comparing the data of the detection with the data input into the database (analysis), d) issuing a warning in case there is a discrepancy between the compared data.

The invention is based on the idea that the state of a rack with its loaded or possibly empty container slots can at any time be recorded by machine/in a mechanical manner. No longer is an operator required to retain in his head to what degree the rack is loaded correctly with containers, but he is relieved of this activity. After activating and starting the recording device a current state of the rack can be recorded. Depending on the requirement set or actuation of the rack a complete rack with all containers or a section or part of the rack may be recorded. According to the invention recording may be effected touch-free or contactlessly. The data recorded may be analysed through subsequent data processing or if optically recorded through image data processing, in that they are compared with data of an earlier recording. The earlier recording may for example reflect an initial state when the rack is completely and correctly loaded with containers or a desired state of the rack, for example with a certain container configuration in accordance with the rules. An initial state may for example represent the correct arrangement of the containers by animal strain and age or by experiment, in order to ensure that the containers to be removed can be found as quickly as possible. In quieter times when the rack is not accessed as frequently, the containers may be rearranged in accordance with these criteria, called "closing gaps". It is, however, easier to perform this sorting in the database or to program a certain routine which then specifies the desired state.

The data of the earlier recording may preferably be stored in the database. If there is a discrepancy between the current and the earlier recording a signal may be output which in a simple case merely triggers an optical or acoustic warning or, in a more expensive design, indicates the discrepancy itself. Alternatively the actual positional data recorded can be entered into the database, and this may again be indicated by a signal. According to the invention therefore, by just pressing a button, a complete rack facility, a single rack or a section of a rack may thus be checked, verified and, if required, corrected for completeness or correct occupancy.

An inventive procedure for withdrawing containers may for example be as follows: selection of the rack in the software/the database; the camera moves into position swivelling towards the rack and takes a picture; the user appears in the picture; the motion detector activates the camera and initiates the taking of pictures; the user removes the containers from slots A1, B3 and C5; a final picture is taken as the user leaves the frame; the final picture is compared with the first picture by means of an image analysis tool, and the withdrawn containers are reported to the software/the database; in SmartRack—the electronic reproduction of the rack in the software based on the database—the reported containers A1, B3, C5 open or are activated; the user confirms the containers at the work station or changing station, if required, via the RFID chip on the cage card holder or a barcode reader; the user manipulates the contents of the containers physically through operations/services and documents the operations/services in the software/the database.

An inventive procedure for replacing the containers may for example be as follows: the user has changed the cage contents at the work station or changing station and has entered this in the software/the database (see above); the data record of the new content of the container is transmitted by infrared to the Smartlabel on the container; the user takes the cage back to the rack; the user appears in the picture of the camera in front of the rack; the motion detector activates the camera to take pictures; the user replaces the containers into the empty slots A1, B3 and C5 in the rack; a final picture is taken as the user leaves the frame of the camera, while a zoomed picture of each of the positions A1, B3, C5 with replaced containers is taken; at the same time the data matrix code on the Smartlabel or on the cage card holder is read and interpreted; the data matrix code of the Smartlabel at position A1 is looked up in the database and the position details in the database are compared with the position in the photo; the same happens with positions B3 and C5; the replaced containers were therefore replaced correctly into their previous positions; the software closes the opened/activated containers in the SmartRack. If the containers were replaced albeit into the empty slots but not in their previous positions, the software issues a warning signal to replace the containers into their correct positions. Alternatively the software accepts the new positions and updates the positional information in the database and issues a corresponding notice.

This method can be applied in principle to all animal transactions such as import, pairing, litter recording, weaning, releasing, but can also be used for the rendering of services such as injections, behaviour observation, cage checks etc. as well for observing the objects in the cage.

According to an advantageous development of the method according to the invention this can be carried automatically and routinely at almost any point in time due to being automated. Preferably it is performed once a process of operations and/or services has been completed. For at this point in time the operator of the rack or of the containers of the last process is still present and can react correctively to a warning according to the invention because of an inadvertent mix-up and trace his potential error. If on the other hand the error is corrected at a later stage this is more time-consuming as a rule and the teaching effect on the operator is less positive.

In principle the recording means can be permanently operative or be activated by an operator entry in step a) by operating a real or virtual switch, for example in that the user selects the rack in the software, or by recording a speech command from the user or by a reading device at the rack. In order to ensure reliable verification of a rack, this user entry too can be monitored, for example in that activation of the recording means is made a prerequisite for activities in an animal space facility. Alternatively activation on the part of the user may be effected quasi unconsciously i.e. by a recording operation of a container at a changing station or by recording a manipulation or positional change of containers in the rack or by a movement on the cage arrangement in step b). The activity is thus started automatically, meaning that checking of the rack is effected not continuously which is unnecessary, but user-independently and regularly and reliably every time a change may have occurred. High accuracy and high quality of the data in the database can thus be ensured.

A further improvement in the recording of processes for containers with an identification means can be achieved according to the invention in that the data reproduced on an identification means of the containers is changed automatically in dependence of changes of the container content. The alteration of data which as a rule takes place for example at a changing station, may be effected as a result of services rendered or activities performed. But also automatic process-free changes such as predefined routines of the computer unit can cause an automatic alteration of the display contents. Following pairing, for example, 21 days go by, before a mouse gives birth to a litter. Because the litters have to be recorded and checked, the displays of all pairing containers, the litters of which must be checked, may automatically be reversed. After a litter has been recorded, it must be displayed on the Smartlabel. This again may take place conventionally in black and white. Because mice are ready to mate after approx. 20 days, they must be removed from the pairing cage (weaning). This measure may be signalled by reversing the display. Following removal two new containers are needed for males and females with strain indication and indication of the number. The display on the original pairing and weaning cage must then be corrected again.

Such a change is therefore preferably carried out electronically, in that the identification means comprises an electronic display and allows electronic—cable-bound or contactless—recording and manipulating. Manual alterations of a display on a container, i.e. in particular the printing and manual exchanging of cage cards, which is one of the commonest sources of error, can thus to be dispensed with. Admittedly this has no influence on the quality of the data in the database, but it simplifies operation of the animal space facility or plant laboratory because there is no longer any need for having to search for errors. In particular with or after process-free alterations a signal may be emitted additionally, which optically or acoustically for example draws the user's attention to the change.

The Smartlabels are as a rule provided with image files, for example bmp files, which are indicated on the display of the Smartlabel. According to a further advantageous development of the invention the image files can be stored in a document-genuine digital archive. This allows the state of the animal space or plant laboratory facility with its containers and contents to be restored at any point in time, also without the presence of the database. The possibility of a document-genuine tracing of data meets e.g. a quality assurance requirement in pharmaceutical companies, the so-called "good laboratory practice" (GLP).

Based on electronic identification means an inventory query concerning the stock (inventory) of containers in one or several racks may be performed not only via the first mentioned recording of containers or racks but also additionally or alternatively via recording the identification means and their data. Based on an electronic identification means, updating of data of the identification means can be additionally performed, at any rate, in the database, and/or only a section of the rack up to a single container may be checked as regards its location and content, like carrying out spot checks.

If the container comprises a separate individual identification code in an almost random place outside a cage card or another display, this individual code may be recorded, according to a further advantageous development of the invention, in the data base, the data of the container and/or its content may be assigned to the code, the data assigned to the code may be altered in dependence of process-free or process-related changes to the container content and the data may be retrieved by detecting the code assigned to them, wherein the steps can be performed at any time separately and independently of each other.

Figure 2:
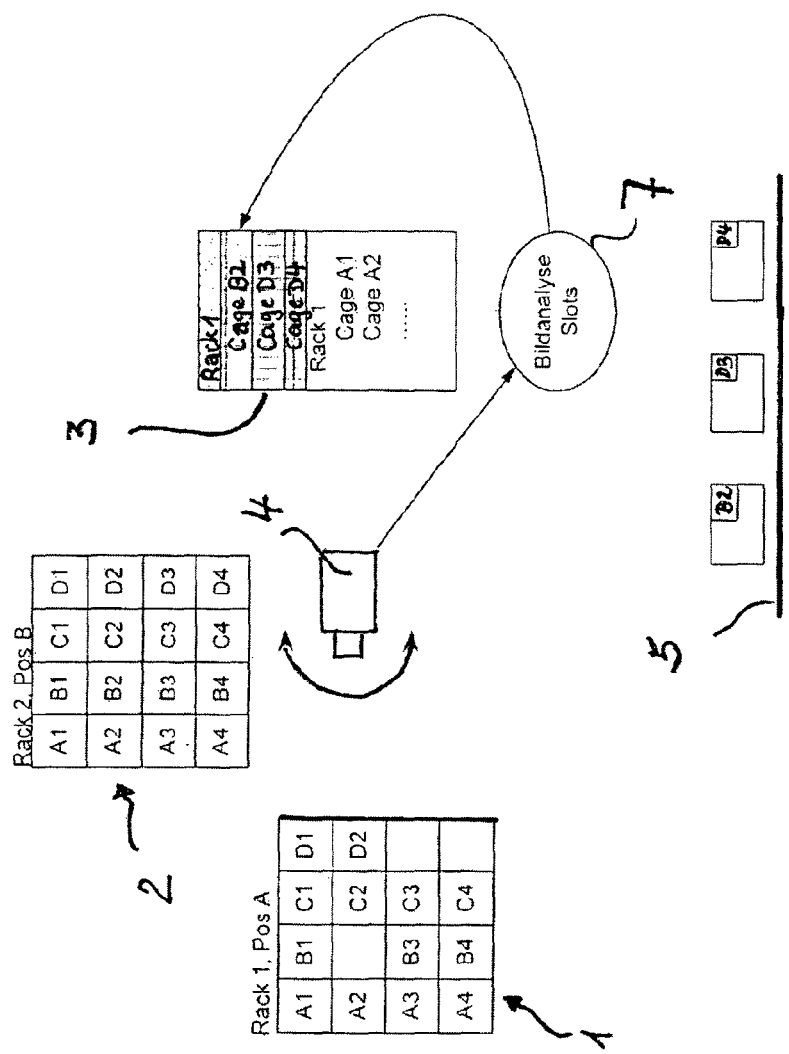
Figure 3:
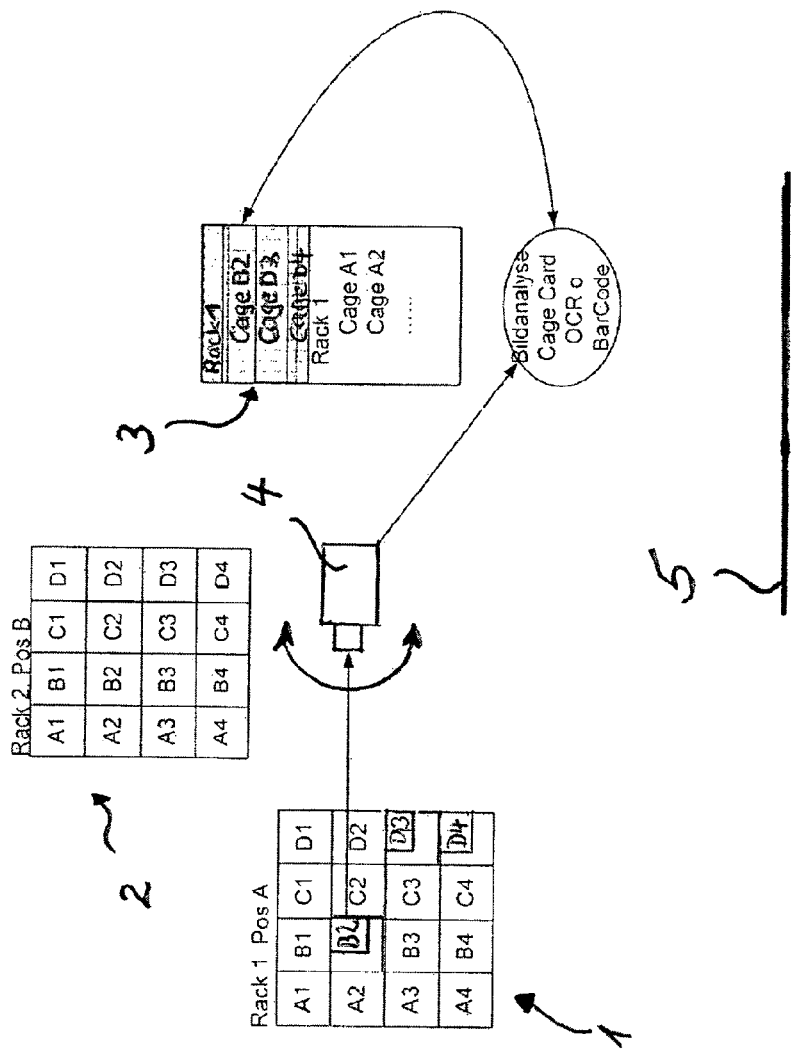
Figure 4:
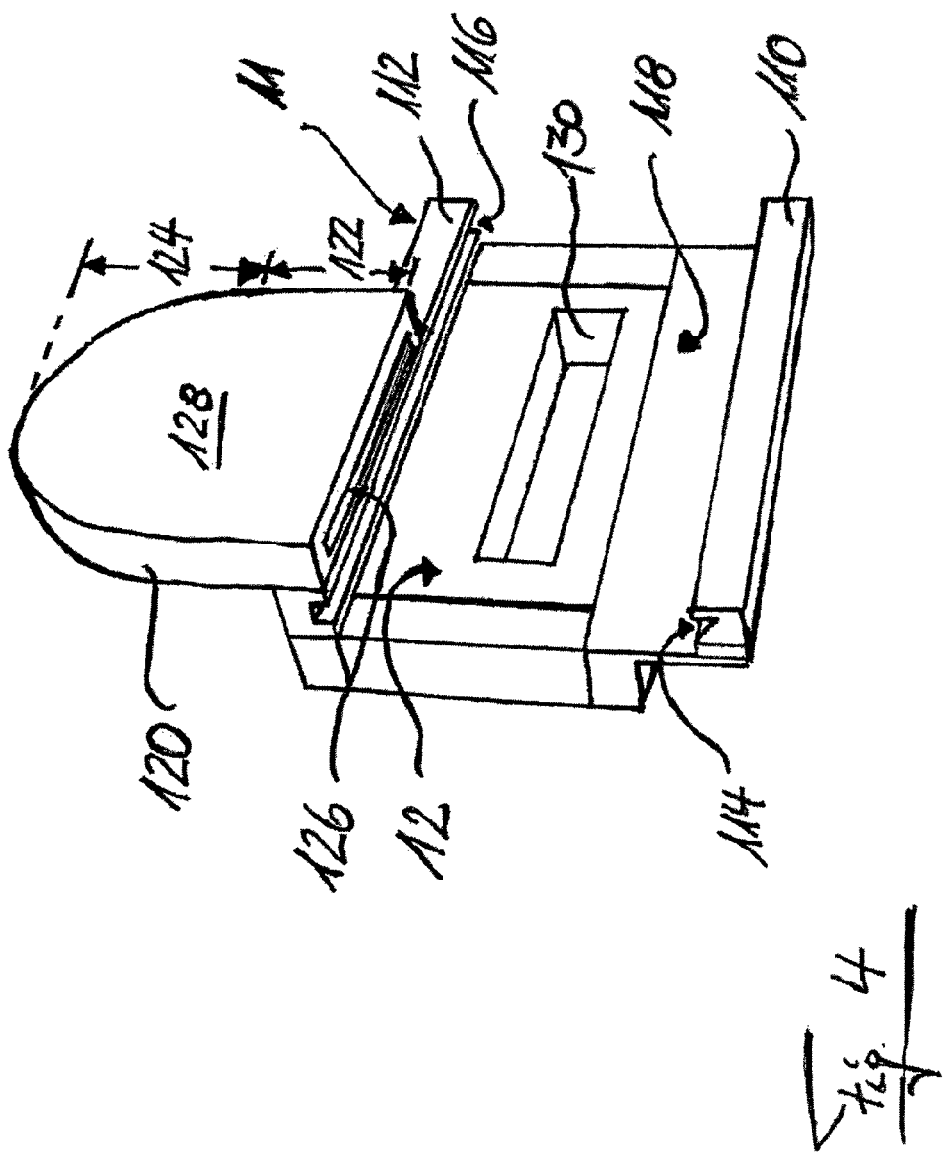
Figure 5:
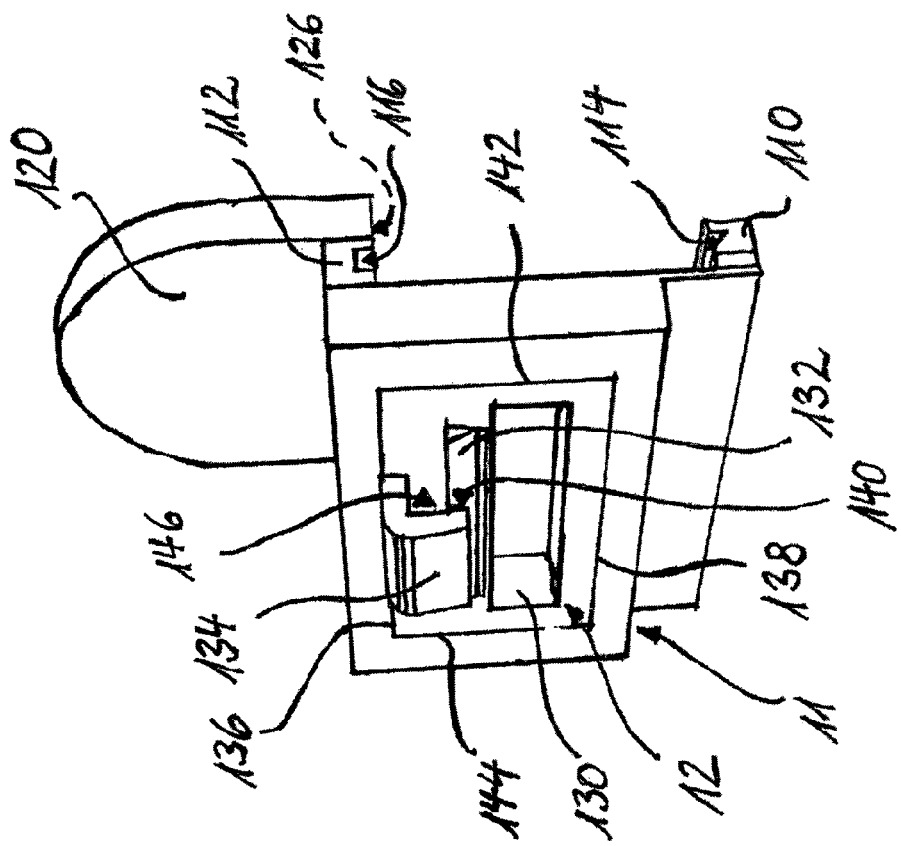
Figure 6:
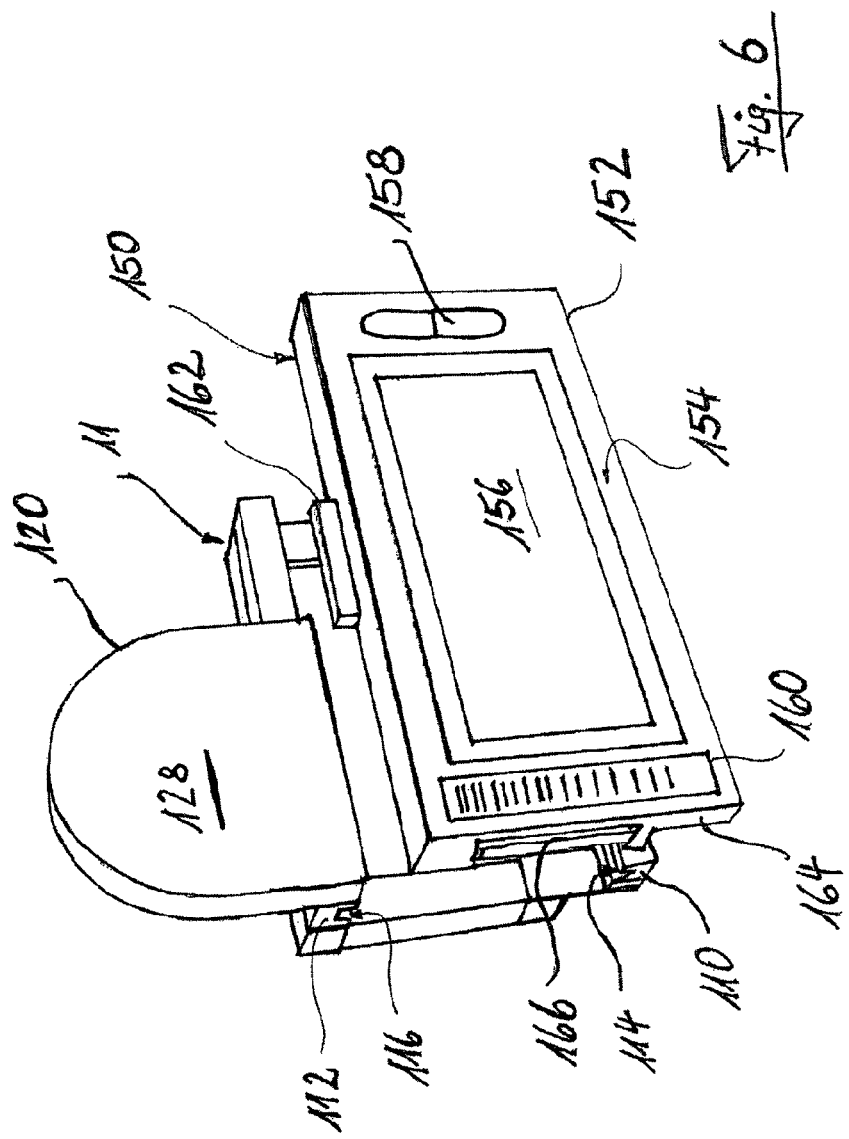
Figure 7:
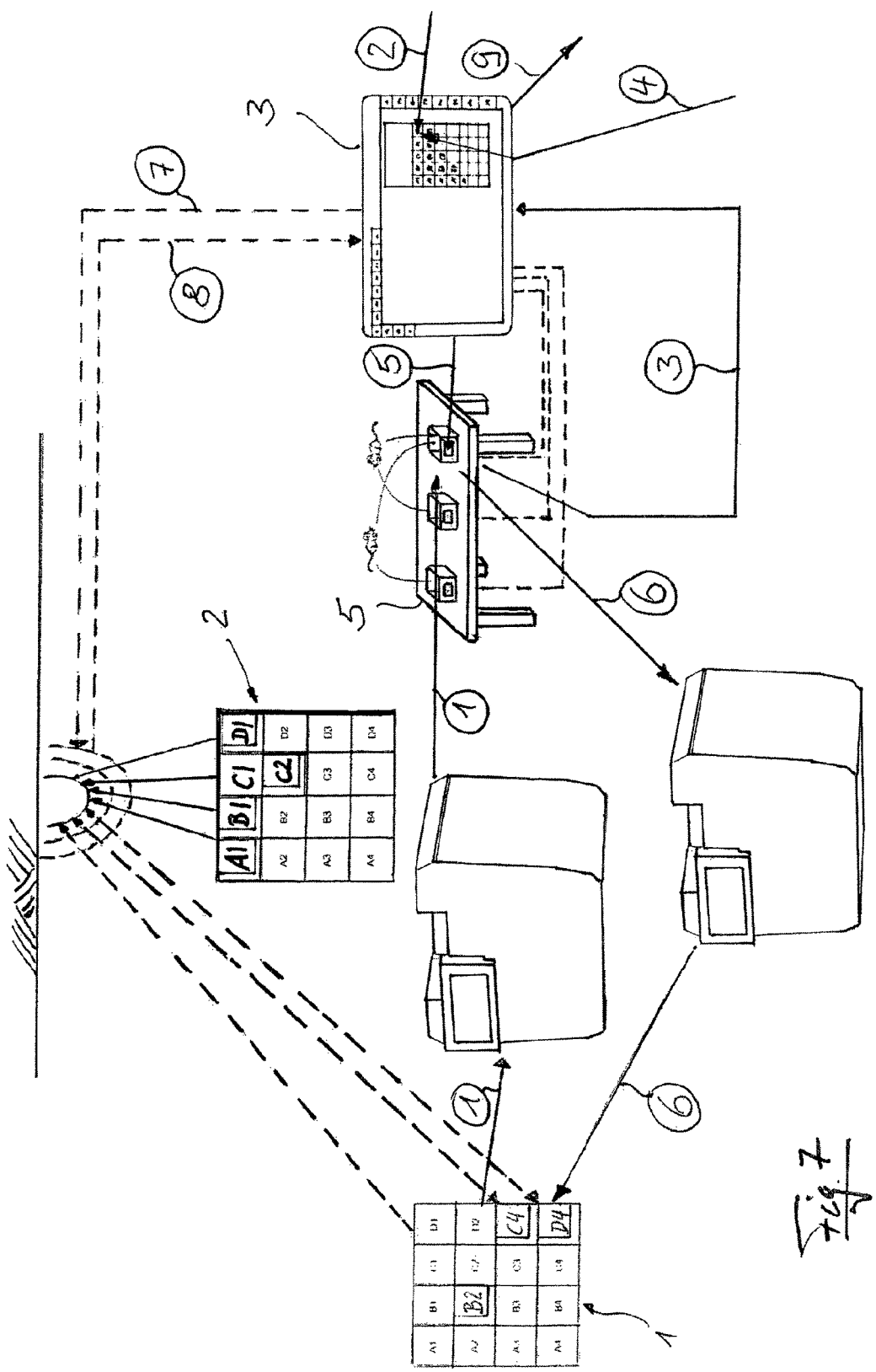

The principle of the invention will now be described in detail by way of example with reference to the drawing, in which FIG. 1 shows the selection of a rack, FIG. 2 shows the withdrawal of a cage, FIG. 3 shows the return of a cage in a device according to the invention, FIG. 4 shows a Smartlabel holder from a front side, FIG. 5 shows a Smartlabel holder shown from a rear side, FIG. 6 shows the Smartlabel holder together with a Smartlabel, FIG. 7 shows a process sequence, FIG. 8 shows the rear side of a smaller Smartlabel, FIG. 9 shows the rear side of a cage card holder, FIG. 10 shows Smartlabels with code displayed within the display panel and outside it, FIG. 11 shows a sketch of the mounting of a prototype Smartlabel holder according to the invention.

FIG. 1 illustrates the selection of a shelf or rack 1, from two available racks 1, 2. The two racks 1, 2 which each take sixteen cages A1, A2 . . . D3, D4 in slots A, B, C, D and in rows 1, 2, 3, 4, are placed in a working area of an animal space facility. Each cage A1, A2 . . . D3, D4 carries a card holder a or cage card not shown separately as an identification means with data relating to cages A1, A2 . . . D3, D4 and their content. The data is conventionally readable as well as being stored on the card with RFID technology and/or barcodes. The two racks 1, 2 together with their positions A, B are recorded by the database-based software called Cage Explorer or SmartRack© which is installed on a computer 3. In the working area a webcam 4 is installed as a camera which can record the whole of both racks 1, 2 and the location of each individual cage A1, A2 . . . D3, D4 in racks 1, 2. The webcam 4 allows the storing of positions A, B of racks 1, 2, or the selection of specific positions A or B in the working area using a software API (Application Programming Interface or programming interface). Rack 1, for example, can be selected on the computer 3 or in SmartRack©, whereupon the webcam 4 can be directed at the rack 1 using the command 6 "direct camera".

A user wants to process the cages B2, D3 and D4 from the rack 1 in a changing station 5. In order to do so he chooses the rack 1 using Cage Explorer. The software hands the position A of the rack 1 in the room directly over to the webcam 4 via cable or WLAN, and the webcam moves to the position A and takes a picture of the rack 1. The user removes the cages B2, D3 and D4 from the rack. The webcam 4 takes further pictures and records the whole of the rack as well as each location or compartment or slot of each individual cage A1, A2 . . . D3, D4. An image analysis program on the computer 3 works out (analyses) in a conversion process 7 that the slots for cages B2, D3 and D4 are empty (see FIG. 2) and passes this information to Cage Explorer on the computer 3. Cage Explorer "opens" cages B2, D3 and D4 at the software level.

The advantage of this process over the following variant is that when he arrives at the changing station 5 with the cages B2, D3 and D4, the user finds that the cages B2, D3 and D4 are already open in Cage Explorer on the computer 3. There he can verify them himself using the RFID on the cage-card holder or the cage card, in that the information on the empty locations of the cages B2, D3 and D4 in the rack 1 from the webcam 4 is matched against the data from the RFID recording for the cages B2, D3 and D4 at the changing station 5. Instead of RFID a process with barcode is also possible.

Thus a two-stage process is possible, namely manual marking in the computer on the one hand, and cross-checking of the correct selection of the cages B2, D3 and D4 on their arrival at the changing station 5 using RFID and the information stored in the database on the other hand.

The following variant is also possible. A user wants to process the cages B2, D3 and D4 from the rack 1 in a changing station 5. To that end he removes the cages B2, D3 and D4 from the rack 1, but in this case without previously making an entry in the computer 3. He arrives at the changing station with the cages B2, D3 and D4. Here the RFID/barcode data of the cages B2, D3 and D4 is recorded. The positioning of the webcam 4 and the image analysis of its images only occur once the RFID data for the cages B2, D3 and D4 has been read at the changing station 5. After that the data is matched against the images from the webcam 4.

FIG. 2 shows the withdrawal of a cage. If it is not software initiated, e.g. by selecting the rack 1 on computer 3 in the software or SmartRack©, the recording is started by the webcam 4 as soon as the user moves in front of the rack 1 and finishes as soon as there are no more such movements. The last image on the webcam 4 will be analysed for open slots. The open slot positions are passed to SmartRack© in the form of coordinates. SmartRack© opens the respective cage B2, D3 and D4. The positions are additionally checked by reading the RFID or the barcode at the changing station 5 in that the RFID data or the barcode is compared with the data stored by Cage Explorer.

FIG. 3—the replacing of a cage—happens as follows. After the animal transactions have been carried out at the changing station 5, the cage cards including their positions are reprinted to reflect the change in the contents of the cages B2, D3 and D4. If necessary changed cage positions in SmartRack® for the withdrawn cages B2, D3 and D4 are also recorded in SmartRack©. The user returns the cages B2, D3 and D4 to the cage positions printed on the cage cards.

If it is not software initiated e.g. by selecting the rack using the software, the recording is started by the webcam 4 as soon as the user moves in front of the rack 1 and finishes as soon as there are no more such movements. By analysing the cage position (OCR/barcode/data matrix code) on the cage card and comparing this with the actual position in the rack 1 each cage B2, D3 and D4 is visually verified in a working process 8. Using the cage ID, the position of each cage B2, D3 and D4 in the rack 1 is verified in the Cage Explorer database.

If one of the cages B2, D3 and D4 in the rack 1 is put in the wrong place, a warning signal is output by the computer 3.

FIG. 4 shows a Smartlabel holder 11. This replaces the cage card holder. The paper cage card according to FIGS. 1 to 3 is replaced by a Smartlabel (see FIG. 6). The Smartlabel holder 11 according to the invention is built quasi frame shaped and includes a plate-shaped base 12. The base 12 is replaceably installed in the Smartlabel holder 11 and can be locked into place in the frame-shaped structure of the latter. In its lower area the Smartlabel holder 11 comprises a horizontal lower rail 110 running along its full width, and a parallel upper rail 112. The lower rail has a V-shaped groove 114 milled into it, which faces a U-shaped groove 116 in the upper rail 112. The lower rail 110 and the upper rail 112 are situated in front of a holder plane 118 of the Smartlabel holder 11 in which the base 12 is also situated.

On the upper rail 112 and in a direction facing the user a chip holder 120 is attached, which protrudes from the Smartlabel holder 11 beyond the upper rail 112. The disk-shaped chip holder 120 consists of a lower section 122 with a rectangular contour and an upper section 124 with a semicircular contour of largely the same height and width such that it can take a coin-shaped chip which is not shown. The chip can be inserted through a receiving slit 126 in the lower section 122 from the underside and removably secured there. The chip holder 120 can preferably take RFID chips which can be removed again from the Smartlabel holder 11 if necessary. Furthermore the chip holder 120 offers a front surface 128 facing the user.

FIG. 5 shows the rear of the Smartlabel holder 11. In this illustration the lower rail 110 with the V-groove 114 and upper rail 112 with the U-groove 116 are recognisable. The Smartlabel holder 11 can hold a Smartlabel, which is not shown in FIGS. 4 and 5, between its lower rail 110 and its upper rail 112 and in front of its holder plane 118. As soon as it is received in the Smartlabel holder 11, it closes the receiving slit 126 of the chip holder 120, so that any chip placed there cannot inadvertently fall out and be lost.

Furthermore FIG. 5 shows the rear configuration of the base 12. In order to save on materials it comprises a window 130 in its lower section. Above that is an abutment 132 which is triangular in cross-section and protrudes from the rear of the base 12. It cooperates with a hook-shaped cage adapter 134 which protrudes orthogonally from an upper edge 136 of the base 12, and then extends in a direction largely parallel to the basis 12 at an angle beyond the abutment. Thus there remains a space 146, largely rectangular in cross-section, between the abutment 132 on the one hand and the hook-shaped cage adapter 134 on the other, which in the area where the cage adapter 134 overhangs the abutment 132 becomes a gap 140.

The largely plate-shaped rectangular base 12 can be removed from or inserted into the frame-shaped Smartlabel holder 11 and can be locked into place in the Smartlabel holder 11 either at its horizontal upper edge 136 or lower edge 138 or at its vertical narrow edges 142, 144. Thus the Smartlabel holder 11 can be attached to various containers such as cages or the like, or adapted to their mountings. In relation to a Smartlabel holder 11 or its base 12, a container offers a mounting means, which may be, for example, a horizontally extending bar or bracket which is forced through the gap 140 into the space 146 between the cage adapter 134 and the abutment 132 or the base 12. In this way the Smartlabel holder 11 is fixed to the container. Furthermore, the design of the cage adapter 134 and the abutment 132 allows the Smartlabel holder 11 to be pivoted about a horizontal axis on the container so that its angle of incline can be changed. In this way, a user can make it easier for himself to read the Smartlabel 11, for example when he wants to eliminate reflections.

FIG. 6 shows a Cage Talker® for the organisation of a container or cage, or the contents thereof, in a laboratory facility, which comprises the Smartlabel holder 11 and, shown in front of it, an as yet not attached SmartLabel 150. Facing the user, the space on the front side 154 of its cubical casing 150 is spatially dominated by a landscape-format rectangular display 156 on which data relating to the container or its contents are rendered on a so-called electronic paper. The rendering is an image file, for example a bmp-file. By suitably configuring a Smartlabel 150 a number of such image files may be archived in the Smartlabel 150 so that it is possible to switch or scroll between different renditions. On the right-hand side next to the display 156 the Smartlabel 150 has an infrared transmitter or receiver 158 through which a communication with the Smartlabel 150 can be established and operated. On the left-hand side next to the display 156 there is a panel 160 with a barcode, which individualises the Smartlabel 150 and distinguishes it from other Smartlabels.

On the top of the casing 152 there is a short upper tongue 162 which cooperates with the U-groove 116 in the Smartlabel holder 11. On the rear of the casing 152 there is a similar lower tongue 168 (only in FIG. 8) which is triangular in cross-section and approximately the same size as the upper tongue 162, which cooperates with the V-groove 114 on the Smartlabel holder 11. Once one of the two tongues is inserted into one of the two grooves 114, 116, the other tongue can be locked into place in the respectively other groove 114, 116, so that the Smartlabel 150 is securely fixed in the Smartlabel holder 11. Thus it is ready to use and can be attached to a container using the cage adapter 134 (see FIG. 2).

On its left-hand end surface 164 the casing 152 has an opening 166 into which a so-called clicker can be inserted. In this way the Smartlabel holder 11 or Smartlabel 150 can easily be optically marked, by fixing a flag-shaped clicker into the opening 166. The clicker may protrude from the Smartlabel 150 in the same plane as the Smartlabel 150 or its display 156, or orthogonally from it, and give simple information about the content of the container.

Alternatively or additionally the front surface 128 of the chip holder 120 offers the possibility of marking the Smartlabel 150 or Smartlabel holder 11 so that it is clearly visible also from greater distances by for example attaching self-adhesive labels or symbols to it.

FIG. 7 shows a highly schematised example of a process sequence:
(1) an empty or full cage with Smartlabel is brought to the changing station
(2) manual selection of the rack or cage position in the user software, otherwise go straight to step (3)
(3) register cage-ID of an empty cage for a slot and/or rack, or open existing cage with ID at the changing station
(4) enter the type of animal the cage is being used for (content of the cage). In Galilei CTS/RTI the cage will already be logged as used. The cage content is irrelevant here.
(5) write the content of the cage on the Smartlabel. This replaces the printed cage card. Otherwise using Galilei CTS/RTI simply print the cage slot and/or rack on the Smartlabel (6) cage with Smartlabel is brought to the rack and placed in the position printed on the Smartlabel.

(7) check desired cage stock: is the cage-ID present? This replaces the RFID census process (8) response of Smartlabel actual cage stock: yes, cage-ID present, or no answer (9) compare desired with actual stock=permanent cage inventory discrepancy.

FIG. 8 shows the rear of the Smartlabel 150. FIG. 9 shows a part of a mounting section 210 of a cage-card holder 200 with two mounting lugs 212 which rise above an extension plane 202 on the holder 200 and with which the holder 200 can be hooked onto the cage.

Figure 10A:
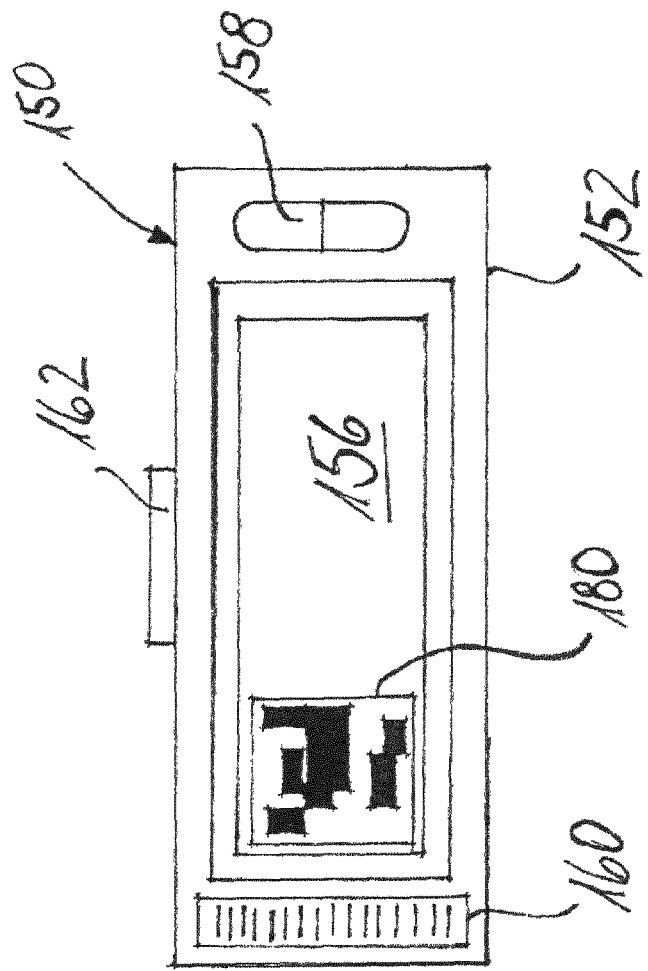

FIGS. 10a and 10b show Smartlabels 150 which differ only in the way in which a data matrix code 180 is placed or mounted on them. According to FIG. 10a the code 180 can be reproduced in the Smartlabel's 150 display panel 156. However, this uses display space which is not then available for other information relating to the container or its content. Therefore the code 180 may also be mounted outside the display panel 156, for example above and separately on the casing 152.

FIG. 11 is a sketch of a prototype of the Smartlabel holder 11 according to the invention, and reflects its mounting on a container 250. The container 250 comprises a lid 252, on the front side 254 of which there is a recess 256 into which the mounting lugs 212 of the cage-card holder 200 as per FIG. 8 or the hook-shaped cage adapter 134 as per FIG. 5 can engage when being attached. On the rear of the Smartlabel 150 there is a recess 190 into which a connector 192 on the Smartlabel holder 11 can engage.

In previous applications the invention is described as follows:

In genetic research for example, in particular in the field of animal and plant research, work is carried out on a large number of test objects. Laboratory animals in animal research are held openly on appropriate shelves or in racks, in whose compartments cages can be arranged, specified as pathogen free for example in individually ventilated cages (IVCs) or in isolators. At separate changing stations laboratory animals may for example be relocated or switched into other cages. However, if the cage user places the cage wrongly, cages with a unique cage number in racks and rack slots (location) do not correspond to the location printed on the cage card and noted in the database. Similar conditions prevail in plant research.

A significant constraint is posed by the fact that from time to time racks must be chemically and/or thermally sterilised, for example autoclaved (132 degrees Celsius, 1 h), so that a solution based on electronic components, such as RFID-readers for each rack slot does not appear to be feasible. Since racks can have up to 120 slots for cages, the costs of such a solution would be disproportionately high viewed in the light of the required aim. Mechanical solutions also equally lead to high costs and the problem of transferring data to a computer. Rack templates are costly and must cover various types of rack.

The invention sets out a system which verifies the physical locations of the cages in the rack and their slot positions in the rack as well as their cage cards.

Ideally, immediately upon removal of the cage from the rack, the corresponding slot in the cage or animal administration software is tagged and opened. By reading the cage card, which is tagged by an RFID chip or which sits in a cage card holder tagged by a chip, using an RFID reader which is contained in a changing station or is portable, or by scanning the barcode on the cage card, the cage can be checked against the rack and slot position noted in the database.

Once the animal or plant transactions have been carried out at the changing station and the cage contents have been altered, new cage cards are printed and inserted into the cage card holders. The cages are then returned to the rack and placed in the rack slots indicated on the cage cards.

The solution is based on a process, a computer program product and a changing station for process tracking as described in the applicant's WO 2011/124 209. It is based on the observation that the status of a rack with its full or, as the case may be, empty slots, can be recorded with as little contact as possible. A contactless recording may be effected for example by radio, by passing directional antennas along the rack, or optically, for example with a camera for each rack or a moveable, for example pivotable and/or mobile camera, for example a webcam or with light barriers. A moveable camera for example may be moved along a vertical rail by means of an electric motor, wherein the vertical rail is moved itself by an electric motor along a horizontal rail. The rails may be installed either on every rack, or separately therefrom, e.g. on the walls of the animal space for many racks in such a way that the camera can move at a relatively short distance in front of the racks. This method has the advantage that, given the short distance from the cages, it can also be used for observing the animals in the cages.

Using data or image processing allows the state to be analysed after the rack has been started up, either by selecting it in the software (rack positions in the space are stored) or by reading the cage at the changing station, using a recording device such as the camera. The data or image analysis can detect empty slot positions in a rack following the removal of a cage as well as detect the cage position of it after its return printed on the cage card in plain text, a barcode, data matrix, or by wireless signal, and then, with the help of the corresponding analysis tools, analyse the data or image and verify that the data match the information stored in the database.

The invention can therefore be described as an animal space facility or plant laboratory facility according to WO 2011/1240209, suitable for the carrying out of a method for process tracking of operations and/or services, which relate to at least one object, with a cage arrangement (rack) with cages, which contain at least one object, with a device for recording the cages, wherein an additional, in particular radio-based and/or optical recording device which records the whole of the cage arrangement and individual cage locations (slots) therein, with a conversion unit which converts the recorded data into electronically processable data, with a data interface for passing the data to a computer unit, with a comparison or analysis unit in which the data can be compared or analysed against stored data.

It can also be described as a process according to WO 2011/124 209 for the process tracking of operations and/or services, relating to at least one object, in an animal space facility or plant laboratory facility, comprising the following steps:

a) activating a recording device for recording cages in the cage arrangement, b) recording the cage arrangement wirelessly or optically, c) comparing the recorded data with input data (analysis), d) issuing a warning where there is a discrepancy between the compared data.

Method according to WO 2011/125 209 for the process tracking of processes and/or services, relating to at least one object, in an animal space facility or plant laboratory facility, in particular according to the above process claim, characterised in that after the completion of a process of operations and/or services, the following steps take place:

e) activating a recording device for recording cages in the cage arrangement,
f) recording the cage arrangement wirelessly or optically,
g) comparing the recorded data with input data (analysis),
h) issuing a warning where there is a discrepancy between the compared data.

Additionally, in one of the above procedures, activation in step a) and/or e) may be based on a user entry. In addition the recording operation in step b) and/or f) can be initiated by the detection of a movement at the cage arrangement. Finally, activation in step a) and/or e) may be based on a recording operation relating to cages at the changing station.

The Smartlabel aspect has been described by the inventor:

In animal research for example, in particular in genetic research, work is carried out with a large number of animals. Laboratory animals are kept in open or closed conditions in individual ventilated cages (IVCs) or in isolators, specified as pathogen-free for example, on appropriate shelves or racks with slots for organising the cages. As a general rule, the racks are installed in cleanrooms with access being gained only through an air lock. The physical work of the animal carers and researchers is carried out in protective clothing comparable to that used in an operating theatre. All materials are brought in via either an autoclave or after being fumigated with hydrogen peroxide.

Switching or moving animals into different cages for example, takes place in separate changing stations. Each change in cage content must be noted down on a cage card. After being handled, the cages are put back into the rack together with their cage cards which are in the cage card holders. Cages have a unique cage number which is registered against a rack or cage slot in that rack, so that the cage can be found quickly later on using the software. The unique cage number is often linked to a barcode or RFID number in order to further accelerate the search for the cage in the software. The barcode is printed on the cage card, the RFID may be integrated either with the paper of the cage card, or may be attached to the cage card holder or the cage itself. The cage card holder includes the paper cage card which is freshly printed every time the cage content changes.

One problem is that the cage cards and the cage card holders and the cages get regularly mixed up when several cages are manipulated at a changing station and many cage cards are printed. In order to avoid a mix-up of cages and cage card holders, the holders in newer systems (Messrs. Tecniplast, Messrs. Allentown) are generally permanently affixed to the cage and no longer need to be removed from the cage when the cages are opened. But even with today's methods there regularly occurs the problem that several cage cards get stacked one behind the other, left lying on the floor, and that their association with the cages is frequently difficult and time-consuming.

Also the printing paper or the ribbon usually runs out when it is most needed. It is difficult to immediately supply new material as it must first be brought in through the air lock. Equally, the use of the printer always poses problems. The auto-cutter repeatedly jams. The user then tears at the paper and thereby damages the printing system so that it must be removed through the air lock for repairs and a new printing system must be brought in through the air lock.

Cage cards are often the only documentation which can be used to reconstruct what has happened to the animals in the cage. The description of the cage content of a particular cage is now as before a legal regulation. Also the reconstruction of the history of the paper cage cards can easily be interrupted "through loss" of the cage card.

Animal administration systems ("Ticklab", "Tierbase", "Smartlab", "Pyrat", "Mausoleum", etc.) are being increasingly introduced. However, these are mostly implemented at the request of the researchers and not tailored to the work carried out in the animal spaces. For the first time Galilei Software has now introduced a system to the market, which is suited to the cage-orientated working methods in animal spaces and which offers functions based exclusively on the cages set on the worktop and on the analysis of the cage contents. Based on this technology the quality of the data is ensured and data entry can take place considerably faster. This technique also allows the automation of routine cage-based processes. See application WO 2001/124 209 by the applicant.

Also a database application is no guarantee for the exact traceability of the transactions, because data is often randomly entered in order to produce a momentary cage card content, whilst the preceding development however, does not reflect reality. At least there are some systems where preceding developments can be checked for plausibility.

A further problem consists in how to invoice the relevant research groups for the cages. To this end the beginning of the use of a cage and the end of the use of a cage by the researcher must be entered ("in service", "out of service").

For this purpose the cages to be handed over, or the cage cards outside the barrier, may be registered by the animal facility management and handed over to the researcher or, in the case of direct animal deliveries, cages can be directly registered at the changing station. When the animals leave the cage or are destroyed, the cage is booked out of the software. The days between the beginning of the use and the end of the use can be calculated and charged to the scientists.

Since cages repeatedly disappear, it is also of interest to establish the use of spot checks, whether or not cages are still physically present at a randomly given time (physical inventory) or it is desirable to establish the point in time when a cage was last used (deletion of the cage in the software, target stock).

Similar conditions exist in plant research in plant laboratory facilities, in which containers with specimens are stored on shelves.

The invention discloses a system which makes the mixing-up of cage card holders and cage cards impossible, because it unifies both functions in one electronic cage card, which makes it possible to archive cage cards as a legal document because the bitmaps for writing on the electronic cage card are archived and which permits physical stock-taking of cages within any personal expense at any date or time because the electronic cage cards can be "pinged" by infrared wave with the response confirming their presence. Because there is no need now for a printing system consisting of printer, paper and print ribbon this source of error is eliminated. Further this electronic cage card permits storing several cage cards or other information in the memory which can be accessed using a simple infrared key without a separate computer being required.

Invention 1 a: Printing Cage Cards on Smartlabels at the Changing Station

Open cage changing station, printing the Smartlabels (cage card) on E paper during the working process. The solution can be installed without problems also at closed cage changing stations. Here with local infrared transmitter.

Invention 1 b: Altering the Cage Card Contents Depending on the State of the Cages For example, cages are ready for removing the animals because they have reached a certain age. Display data for experiments, e.g. the animals in this cage need to be weighed. Alarm conditions to be communicated to the researcher, e.g. "animal is ill". In this case the transmitters/receivers need to be mounted on the ceiling in the animal space. The Smartlabel may comprise an additional (optical and/or acoustic) signalling device which displays changes to the data or alarm conditions.

Invention Part 2a: Check (Ad-Hoc) to Ensure the Presence of a Cage Via SmartRack This allows the scientist to check whether his cage is really present when he presses the respective button on the SmartRack.

Invention Part 2b: Electronic (Physical) Stock-Taking of the Rack and Rooms, Displaying Stock-Taking Differences This constitutes a bulk check as to whether the cages (as per software) are in a rack or in a room.

Invention 3: Combination of Short and Long-Distance Communications

Combination of technologies for short-distance and long-distance communications in the Smartlabel, is it configured for IR, HF and/or UHF communication? Short-distance communication e.g. via HF technology with a changing station, long-distance communication e.g. with a stationary transmitting and/or receiving station on the ceiling of the room. As an alternative to HF technology a short-distance communication may established by attenuating a UHF-RFID antenna.

Invention 4: Data Spectacles

Smartlabels are expensive, cheaper models have a small display which is unable to display all data. A separate mobile reader (visual display unit, data spectacles) may be used to display all data of a selected Smartlabel, including data not shown in the display.

An animal space facility or plant laboratory facility according to WO 2011/124 209, suitable for performing a method for process tracking of operations and/or services relating to at least one object, with a rack (cage arrangement) with containers or cages containing at least one object, with a device for recording data of the cage, with a computer unit with a database for recording and processing data, with identification means on each container, with data relating to the container and its content which are stored in the identification means, with Smartlabels (electronic paper labels) as identification means, wherein a transmitting and a receiving device coupled to the computer unit and configured for communication (short-distance and/or long-distance) with the Smartlabels.

In addition the above facility may be equipped with a changing station, wherein the transmitting and the receiving devices are arranged so as to be stationary outside the changing station (in the facility). Further the communication between the transmitting and the receiving devices and the Smartlabels may be based on IR or HF or UHF or WLAN technology or a combination of these technologies. In addition a separate mobile reading device (visual display unit, data spectacles) for displaying all data (not only those shown) of an identification means may be provided. Further a recording means may be provided in the changing station, which is based on IR or HF or UHF or WLAN technology or a combination of these technologies.

A corresponding method for operating an animal space facility or plant laboratory facility according to WO 2011/124 209, for process tracking of operations and/or services relating to at least one object, in an animal space facility or plant laboratory facility, with racks for receiving containers (cages), with identification means on each container with data relating to the container and its content, with a computer unit with a database for receiving and processing data of the identification means, may comprise the following steps:

a) recording (recording data of) an identification means of a container in the database, b) (electronically) optically reproducing at least a part of the data shown on the identification means, c) altering the data reproduced on the identification means in dependence of process-free changes to the container content (e.g. based on predefined routines of the computer unit).

In addition an alteration of the data in step c) may be additionally signalled (optically, acoustically) on the identification carrier. Further the status (location, content) of a single container may be polled at any given time and, if required, may be output on a mobile or stationary screen.

In addition a (physical) inventory may be polled at any point in time regarding the number of containers in one or in several racks (e.g. in a room) and/or an update of the data in the database may be performed (and output on a screen). Finally changes may be made to the data on the identification means in dependence of processes (operations/services) recorded at the changing station.

The aspect "position recognition of containers in a rack" is described as follows:

The invention describes a system which recognises the data of cages and the physical locations of the cage in the rack and their slot positions in the rack via an unique cage identification number as optical coding (e.g. data matrix code, QR code . . . ) without the necessity for a cage card (consisting of conventional or electronic paper) which explicitly displays the position. To this end an unique cage identification number is applied to an adapter between cage/cage lid and electronic cage card (see FIG. 1) or an adapter between cage/cage lid and a cage card holder or on the cage card holder, the cage or the cage lid itself (see figure A).

The advantage of this method consists in that scientists, as for the above-mentioned cage positions, can now explicitly specify the cage when planning animal transactions (such as pairings), so that errors during selection of the animals due to purely textual information, as has so far been common (e.g. strain, age, sex), can be avoided. This means a great relief in responsibility to the animal's carer. Even with methods which already take the cage positions in the rack (SmartRack) into account (see WO 2001/124 209) there is no guarantee that the cage is indeed in the envisaged position. Admittedly this can be ensured by displaying a cage position on the electronic cage card in conjunction with its optical and/or wireless recording (see the unpublished preliminary application DE 10 2012 109 320). But above all, using the present invention, the costly use of electronic paper for representing cage identification codes can be avoided, and the entire display area is available for animal data. As a result considerable cost savings can be achieved. The large Pricer label based on E-ink (electronic ink) (see figure D) costs EUR 60.00. The smaller label (see figure K) costs about EUR 15.00 and fulfils its purpose just like the large label. A further point consists in the reflections which can occur on an electronic label at the outer glass when the incidence of light is unfavourable. By applying the code e.g. to the adapter this problem can be completely avoided due to selecting a suitable background for imprinting the code or due to using a suitable adhesive label.

A further advantage of the invention consists in that the cage identification number can be read using conventional barcode or data matrix code readers or Smartphones at the changing station or at the rack, and in that it can be used in working processes.

A further advantages is that Smartlabels are equipped with an NFC chip (near field communication). In this case the code in the NFC chip, which may contain an identification code for the cage, can be used for reading the cages at the changing station. In this case it may not be necessary to equip the chip with a LF, HF or UHF chip. Equipping it with a LF or HF or UHF transponder may in certain circumstances be necessary so that the SmartRack can react immediately when the tag is read at the changing station. The wakeups of Smartlabels available on the market for labels communicating via infrared are, as a rule, one second, and from 8 seconds for labels communicating via UHF. This time span is too long as a rule for a smooth workflow at the changing station.

With the aid of the NFC code further information on the animals in their cages can be retrieved on a playback device with an NFC reader, or on websites for web-based systems. To do this separate playback devices with an NFC reader are available or smartphones can be used. Most smartphones are nowadays equipped with a NFC reader.

Advantageously LF or HF or UHF transponders or a separate NFC chip are attached on or in the adapter or behind the data matrix code. This is the best place for reading, because there is no electronics in the way. The adapters can thus be pre-manufactured with the codes leaving merely the end devices (cage and Smartlabel) to be connected. Smartlabels and cages can then be left in their original state.

Ideally as soon as a cage is withdrawn from the rack, the corresponding slot is marked in the cage/animal administration software and opened, and when it is returned the physical position of the cage in the rack is displayed in the software (SmartRack). By scanning the optical code, such as a data matrix code or QR code, a barcode, a point pattern or chaotic pattern, which represents e.g. the inventory number (cage identification number) of the cage, the position of the cage in the rack can be ascertained via image analysis and a mathematical procedure, can be passed onto a software for further processing and regularly verified by a comparison with the rack and slot position noted in the database.

The solution is based on a method, a computer program product and a changing station for process tracking as described in the applicant's WO 2001/124 209. It is based on the observation that the state of a rack with its filled and possibly empty slots can be recorded and analysed by data and image processing at any time optically e.g. with a pivotable webcam or camera, after the rack has been selected either by selecting it at the changing station with an optical recording means such as a camera, or by starting the recording with the aid of a motion sensor or the camera directed at the rack.

The image analysis and the mathematical procedure for ascertaining the slot coordinates may be directly integrated with the detection unit (e.g. Raspberry PI combined with a webcam or camera) with the data (cage identification number and position number) being directly transferred to a further processing system (e.g. WO 2001/124 209 or another animal information system) or the image analysis is carried out remotely on another computer or is carried out directly in a browser (www.tagsrepublic.com) and then made available e.g. through web services.

With so-called rack library systems used for space-saving purposes, where the racks, in order to withdraw the cages, must first be pushed apart, the camera may be integrated in the rack opposite the rack from which the cage is withdrawn. The data/image analysis is able to determine empty slot positions in a rack after withdrawing a cage, due to the pixel array of a withdrawn cage being distinctly different, in terms of image analysis, from that of a cage inserted back in the rack, and also, after returning the cage, to analyse the inventory number written on the adapter or the cage lid or the cage trough on the front with the aid of the respective analysis tool, and to check the cage position in the rack for a match with the details stored in the database or to actively change the positions of the cages in the database.

Preferably the data matrix code may be attached to an adapter with non-reflecting background. Alternatively it may be printed or attached by laser on the cage card holder or on the cage itself. Here readability can be additionally improved by using a luminescent substance (nano particles/pigments, see e.g. EP 1736914 A2) for attaching the code. In this case for example the pigments representing the code or stimulated at one wavelength, but reflect the code on another wavelength.

With regard to the unpublished previous application of the applicant (DE 10 2012 109 320) or the accompanying figures the description continues as follows:

FIG. 1: Selection of the Rack

Two racks 1, 2, each receiving 16 cages A1, A2 . . . D3, D4 are positioned in a work room. Each cage carries an engraved code in the front area of its lid with cage-related inventory data. The code is machine-readable. In addition each cage has a card holder or a cage card with the same data or further data relating to the cage and its content. The cage identification numbers are linked in a database of Cage Explorer with data relating to the content of the cage or can be linked therewith. In addition each cage carries a card holder or a cage card with the same data or further data relating to the cage and its content. The data is readable conventionally or additionally by machine at a short distance, e.g. using RFID technology (LF, HF, NCF, attenuated UHF antennas) or by optical recognition.

The two racks 1, 2 including their positions A, B are recorded in a software (Cage Explorer or SmartRack®) installed on a computer 3 and based on a database. In the work room a webcam 4 is installed, which can detect the two racks 1, 2 as a whole and each individual cage A1, A2 . . . D3, D4 in the rack 1, 2. The webcam permits storing of positions A, B/selecting certain positions A or B in the work room with the aid of a software API (Application Programming Interface or program interface).

a) Selection in Cage Explorer

A user intends to work on cages B2, D3 and D4 from rack 1 at a changing station 5. To this end he selects rack 1 in Cage Explorer: The software transfers position A of rack 1 in the room directly to the webcam 4 either via cable or via WLAN, and the webcam 4 goes to position A and takes a picture of the rack. The user withdraws cages B2, D3 and D4 from the rack 1. The webcam takes further pictures and records the rack as a whole as well as each location or slot of each individual cage A1, A2 . . . D3, D4. The image analysis program finds that the slots of cages B2, D3 and D4 are empty (see FIG. 2) and passes this information onto Cage Explorer. Cage Explorer "opens" cages B2, D3 and D4 at the software level.

The advantage of this method compared with the following variant b) consists in that the user finds that the cages B2, D3 and D4 are already open in Cage Explorer, when he arrives with the cages B2, D3 and D4 at the changing station 5. Here he can additionally verify them by means of the RFID on the cage card holder or the cage card itself, in that the information of the webcam 4 relating to the empty locations of cages B2, D3 and D4 is compared with the data from the RFID recording of cages B2, D3 and D4 at the changing station 5. Instead of RFID a method with barcode is possible.

The method is therefore comprised of two stages, namely manual marking on computer 3 on the one hand, and on the other, cross-checking that the correct cages B2, D3 and D4 were selected on their arrival at the changing station 5 by means of RFID and the information stored in the database.

b) Selection by Exclusively Reading the RFID or the Barcode of the Cage at the Changing Station A user intends to work on cages B2, D3 and D4 from rack 1 at a changing station 5. To this end he withdraws cages B2, D3 and D4 from the rack 1, but in this case without previous input at computer 3. He arrives at the changing station 5 with cages B2, D3 and D4. Here the RFID/barcode data of cages B2, D3 and D4 are detected. Positioning of the webcam 4 and the image analysis of its pictures do not take place until the RFID data of cages B2, D3 and D4 have been read at the changing station 5. The data is then matched against the images of the webcam 4.

FIG. 2: Withdrawing the Cages

Recording by webcam 4 starts, provided it is not software-controlled such as by selecting the rack in the software, as soon as the user moves in front of the rack 1, and ends when the movements stop. The last picture of the webcam 4 is analysed for open slots. The open slot positions are handed over to SmartRack® in the form of coordinates. Smart-Rack® opens the respective cage B2, D3 and D4. The position is additionally verified by reading the RFID or the barcode at the changing station 5 by matching the data of the RFID or the barcode against the stored data of Cage Explorer.

FIG. 3: Replacing the Cages

After the animal transactions have been carried out at the changing station 5, and the contents of cages B2, D3 and D4 have been altered, the cage cards including their positions are reprinted. Possibly altered cage positions are also recorded in SmartRack® for the withdrawn cages B2, D3 and D4. The user returns the cages B2, D3 and D4 to the positions printed on the cage cards.

Recording by webcam 4 starts, provided it is not software-controlled such as by selecting the rack in the software, as soon as the user moves in front of the rack 1, and ends when the movements stop. By recording the actual location of the returned cage and its code and by matching it against the corresponding data in the database of the cage, each cage B2, D3 and D4 is visually verified.

If one of cages B2, D3 and D4 is wrongly positioned a warning signal is emitted at the computer 3.

The invention can also be described as an animal space facility or plant laboratory facility in particular according to WO 2001/124 209, suitable for performing a method for process tracking of operations and/or services relating to at least one object, with a shelf or a cage arrangement (rack) with containers (cages) containing at least one object, with a device for recording container data, with a computer unit with a database for receiving and processing data, characterised by an individual code on the container and outside a cage card or a display of a Smart Label (electronic paper labels), which may be read from the container deposited in the rack in a conventional manner or by machine.

In addition the facility may comprise a container and/or a card holder and/or an adapter for attaching the card holder to the container and/or a casing of a SmartLabel and/or an inlay for attaching to the container, to a card holder, to an adapter and/or to the casing of the SmartLabel carrying the code.

Moreover the invention relates to a container and/or card holder and/or adapter for attaching the card holder to the container and/or casing of a SmartLabel and/or inlay for attaching to the container, to the card holder, to the adapter and/or to the casing of the SmartLabel carrying an individual code which can be read in a conventional manner or is machine-readable, in particular for use in an animal space facility or plant laboratory facility.

Finally the invention relates to a method for operating an animal space facility or plant laboratory facility in particular according to WO 2001/124 209, for process tracking of operations and/or services relating to at least one object, in an animal space facility or plant laboratory facility, with racks for receiving containers (cages), with a computer unit with a database for receiving and processing data relating to the containers and their content, comprising the following steps:

a) detecting an individual code on the container and outside a cage card or a display of a SmartLabel (electronic paper label) in the database, b) associating data of the container and/or its content with the code, c) altering the data associated with the code in dependence of (process-free or process-related) alterations to the container content, d) retrieving the data by detecting the code associated with it, wherein the steps c) and d) can be carried out at any time separately and independently of each other.

The associated drawings show a data matrix code on a cage with Laserwriter, a data matrix code on a cage lock with Laserwriter, data matrix code decoding with webcam, e.g. http://www.tagsrepublic.com/), a data matrix code on SmartLabel, an interpretation or decryption of a data matrix code, the back of a smaller SmartLabel, the back of a cage card holder, cage lid with recesses for attaching the cage card holder, the back of a smaller SmartLabel, the back of a cage card holder, cage lid with recesses for attaching the cage card holder, SmartLabels with code in the display and outside the display.

LIST OF REFERENCE SYMBOLS

| List of Reference Symbols | |
|---|---|
| 1, 2 | rack |
| 3 | computer |
| 4 | webcam |
| 5 | changing station |
| 6 | command "camera control" |
| 8 | working process |
| 11 | SmartLabel holder |
| 12 | base |
| 110 | lower rail |
| 112 | upper rail |
| 114 | V groove |
| 116 | U groove |
| 118 | holder plane |
| 120 | chip holder |
| 122 | lower section |
| 124 | upper section |

-continued

List of Reference Symbols

| | |
|---|---|
| 126 | receiving slit |
| 128 | front surface |
| 130 | window |
| 132 | abutment |
| 134 | cage adapter |
| 136 | upper edge |
| 138 | lower edge |
| 140 | gap |
| 142, 144 | narrow side |
| 146 | space |
| 150 | SmartLabel |
| 152 | casing |
| 154 | front side |
| 156 | display |
| 158 | infrared transmitter/receiver |
| 160 | field |
| 162 | upper tongue |
| 164 | left-hand end surface |
| 166 | opening |
| 168 | lower tongue |
| 180 | data matrix code |
| 190 | recess |
| 192 | connector |
| 200 | cage card holder |
| 202 | extension plane |
| 210 | mounting section |
| 212 | mounting lugs |
| 250 | container |
| 252 | lid |
| 254 | front side |
| 256 | recess |

The invention claimed is:

1. A device for an animal space facility or a plant laboratory facility, a warehouse or the like, the device being suitable for performing a method for organization of at least one object, the device comprising:
a rack or a cage arrangement with an operating side, the rack or the cage arrangement comprising:
one or more containers or cages, which are empty or contain the at least one object;
a positional marking on one or more of the one or more containers or cages; and
an identification means on one or more of the one or more containers or cages;
a single recording device configured to optically record an image comprising an entirety of the rack or the cage arrangement, and the individual containers or cages in the entirety of the rack or the cage arrangement; and
a computer unit configured to store and process data, wherein
the single recording device is adapted and configured to record the locations of the one or more containers or cages in the rack or the cage arrangement,
the single recording device is installed independently of the rack or the cage arrangement in a room, in which there are one or more racks or cage arrangements, and
the computer unit is configured to perform processes of:
identifying a position of a container or cage of the one or more containers or cages on the basis of the image recorded by the single recording device and the positional marking displayed on the container or cage,
detecting the identification means provided on the container or cage,
looking up position data associated with the identification means in a database,
comparing the position of the container or cage identified on the basis of the recorded image and the positional marking, with the position data stored in the database, and
in a case that there is a discrepancy between the position of the container or cage identified on the basis of the recorded image and the positional marking, and the position data stored in the database, emitting a warning signal.

2. The device according to claim 1, the device comprising:
a switch-on device for activating the device,
a conversion unit, which converts the recorded data into electronically processable data,
a data interface for passing the data to the computer unit,
a comparison or analysis unit, in which data can be compared or analyzed with stored data, and
a signaling device for emitting the warning signal in case of the discrepancy occurring based on the results of the comparison or analysis with the stored data by the computer unit, wherein
the signaling device is further configured to emit the warning signal in a case that there is a discrepancy between a current image of the rack or the cage arrangement and a comparison image of the rack or the cage arrangement, the comparison image showing a desired state of the rack or the cage arrangement.

3. The device according to claim 2, further comprising
a transmitting and receiving device, which is coupled with the computer unit, wherein
a Smartlabel is provided on the one or more containers or cages as the identification means, wherein the Smartlabel comprises a transmitter, and
the transmitting and receiving device is configured for communication with the Smartlabel.

4. The device according to claim 3, wherein
the device further comprises a changing station,
the transmitting and receiving device is provided at the changing station,
the transmitting and receiving device is configured to record the Smartlabel,
the changing station comprises a surface onto which one or more containers or cages removed from the rack or the cage arrangement are placed,
the changing station is separate from the single recording device, and
the changing station is separate from the rack or the cage arrangement.

5. The device according to claim 1, wherein an individual code is provided on each container or cage outside a cage card or outside a display of a Smartlabel, and
wherein the individual code is machine-readable either in a conventional manner or by the single recording device.

6. The device according to claim 5, wherein the code is the positional marking.

7. The device according to claim 1, further comprising a transmitting and receiving device, which is coupled with the computer unit.

8. The device according to claim 1, wherein the identification means comprises one from the group consisting of an optical code, an optically detectable code, a barcode, a QR code, a data matrix code and a braille code.

9. A method for process tracking of operations or services relating to a device for an animal space facility or a plant laboratory facility, a warehouse or the like, the device being suitable for performing a method for organization of at least one object, the device comprising:

a rack or a cage arrangement with an operating side, the rack or the cage arrangement comprising one or more containers or cages, which are empty or contain the at least one object, a single recording device configured to optically record an image comprising an entirety of the rack or the cage arrangement and the individual containers or cages in the entirety of the rack or the cage arrangement, and a computer unit configured to store and process data, wherein the single recording device is adapted and configured to record locations of the one or more containers or cages in the rack or the cage arrangement, and the single recording device is installed independently of the rack or the cage arrangement in a room, in which there are one or more racks or cage arrangements, the method comprising the following steps:

a) activating the single recording device for automatically recording the containers or cages in the rack or the cage arrangement, b) recording an image comprising the entirety of the rack or the cage arrangement and the individual containers or cages in the entirety of the rack or the cage arrangement or a section of the entirety of the rack or the cage arrangement and the individual containers or cages in the section of the rack or the cage arrangement, c) identifying a position of a container or cage of the one or more containers or cages on the basis of the image recorded by the single recording device and a positional marking displayed on the container or cage, d) detecting an identification means provided on the container or cage, f) looking up position data associated with the identification means in a database, g) comparing the position of the container or cage identified on the basis of the recorded image and the positional marking, with the position data stored in the database, and h) emitting a warning or update in case there is a discrepancy between the position of the container or cage identified on the basis of the recorded image and the positional marking, and the position data stored in the database.

10. The method according to claim 9, wherein the method is performed during or after completion of a process of the operations or services.

11. The method according to claim 10, wherein the activation in step a) is effected by a recording operation of a container at a changing station, wherein the changing station comprises a surface onto which one or more containers or cages removed from the rack or the cage arrangement are placed, wherein the changing station is separate from the single recording device, and wherein the changing station is separate from the rack or the cage arrangement.

12. The method according to claim 11, wherein the method further comprises:

updating data reproduced on the identification means of the container or cage in accordance with processes recorded at a changing station or changes to the contents of the container or cage.

13. The method according to claim 12, wherein a display of the identification means is updated electronically.

14. The method according to claim 13, wherein one or more image files are stored in a document-genuine digital archive.

15. The method according to claim 13, wherein the display of the identification means is the positional marking.

16. The method according to claim 9, wherein an inventory query concerning a stock or inventory of the containers or cages in one or more racks or cage arrangements is performed via recording of the containers or cages, or the racks or cage arrangements; or via recording the identification means and data regarding the identification means.

17. The method according to claim 9, wherein the device further comprises a transmitting and receiving device, which is coupled with the computer unit, and the data of the recording comprises information obtained from the identification means.

18. The method according to claim 17, wherein the identification means comprises one from the group consisting of an optical code, an optically detectable code, a barcode, a QR code, a data matrix code and a braille code.

19. The method according to claim 9, wherein the recording in step b) includes recording an image comprising a section of the entirety of the rack or the cage arrangement and the individual containers or cages in the section of the rack or the cage arrangement, and wherein each rack slot comprises an individual ID.

* * * * *